(12) United States Patent
Lucas

(10) Patent No.: US 12,443,270 B2
(45) Date of Patent: *Oct. 14, 2025

(54) DISTANCE DETERMINATION FOR MIXED REALITY INTERACTION

(71) Applicant: Snap Inc., Santa Monica, CA (US)

(72) Inventor: Benjamin Lucas, San Francisco, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/664,962

(22) Filed: May 15, 2024

(65) Prior Publication Data
US 2024/0295918 A1    Sep. 5, 2024

Related U.S. Application Data

(63) Continuation of application No. 17/565,321, filed on Dec. 29, 2021, now Pat. No. 12,008,152.
(Continued)

(51) Int. Cl.
*G06F 3/01*    (2006.01)
*G06F 3/0346*  (2013.01)
(Continued)

(52) U.S. Cl.
CPC ............ *G06F 3/011* (2013.01); *G06F 3/0346* (2013.01); *G06F 3/04815* (2013.01); *G06F 3/0482* (2013.01); *G06F 3/04847* (2013.01)

(58) Field of Classification Search
CPC .......... G06F 3/011; G06F 3/012; G06F 3/013; G06F 3/014; G06F 3/017; G06F 3/0346;
(Continued)

(56) References Cited

U.S. PATENT DOCUMENTS

| 7,971,156 B2 | 6/2011 | Albertson et al. |
| 7,996,793 B2 | 8/2011 | Latta et al. |

(Continued)

FOREIGN PATENT DOCUMENTS

| CN | 103049761 B | 8/2016 |
| EP | 3707693 A1 | 9/2020 |

(Continued)

OTHER PUBLICATIONS

"U.S. Appl. No. 17/565,321, 312 Amendment filed May 6, 2024", 8 pgs.

(Continued)

*Primary Examiner* — Vijay Shankar
(74) *Attorney, Agent, or Firm* — Schwegman Lundberg & Woessner, P.A.

(57) ABSTRACT

Systems, methods, and computer readable media that determines distances for mixed reality interaction, where the methods include determining a first position of a point of a surface and rendering a virtual reality (VR) interactive item comprising a VR interactive control. The methods further include tracking a control indicator controlled by the user by determining a first plurality of positions of the control indicator and activating the VR interactive control in response to detecting the control indicator controlled by the user transgressing a first threshold distance from the VR interactive control. The methods further include determining a closest position of the first plurality of positions to the point based on the first position, determining the point of the surface to have a second position based on the determined closest position plus a constant for the control indicator, and associating a second threshold with the point of the surface.

20 Claims, 16 Drawing Sheets

Related U.S. Application Data

(60) Provisional application No. 63/132,784, filed on Dec. 31, 2020.

(51) Int. Cl.
*G06F 3/04815* (2022.01)
*G06F 3/0482* (2013.01)
*G06F 3/04847* (2022.01)

(58) Field of Classification Search
CPC ............. G06F 3/04815; G06F 3/0482; G06F 3/04847; G06F 3/0488; G06F 3/04883
See application file for complete search history.

(56) References Cited

U.S. PATENT DOCUMENTS

| | | |
|---|---|---|
| 8,487,938 B2 | 7/2013 | Latta et al. |
| 8,856,691 B2 | 10/2014 | Geisner et al. |
| 9,225,897 B1 | 12/2015 | Sehn et al. |
| 9,230,160 B1 | 1/2016 | Kanter |
| 9,230,368 B2 | 1/2016 | Keane et al. |
| 9,276,886 B1 | 3/2016 | Samaranayake |
| 9,705,831 B2 | 7/2017 | Spiegel |
| 9,742,713 B2 | 8/2017 | Spiegel et al. |
| 10,102,423 B2 | 10/2018 | Shaburov et al. |
| 10,284,508 B1 | 5/2019 | Allen et al. |
| 10,439,972 B1 | 10/2019 | Spiegel et al. |
| 10,509,466 B1 | 12/2019 | Miller et al. |
| 10,514,876 B2 | 12/2019 | Sehn |
| 10,579,869 B1 | 3/2020 | Xiong et al. |
| 10,614,855 B2 | 4/2020 | Huang |
| 10,627,625 B2 | 4/2020 | Hoover et al. |
| 10,748,347 B1 | 8/2020 | Li et al. |
| 10,861,242 B2 | 12/2020 | Lacey et al. |
| 10,958,608 B1 | 3/2021 | Allen et al. |
| 10,962,809 B1 | 3/2021 | Castañeda |
| 10,996,846 B2 | 5/2021 | Robertson et al. |
| 10,997,787 B2 | 5/2021 | Ge et al. |
| 11,012,390 B1 | 5/2021 | Al Majid et al. |
| 11,017,679 B2 | 5/2021 | Moster et al. |
| 11,030,454 B1 | 6/2021 | Xiong et al. |
| 11,036,368 B1 | 6/2021 | Al Majid et al. |
| 11,062,498 B1 | 7/2021 | Voss et al. |
| 11,087,728 B1 | 8/2021 | Canberk et al. |
| 11,092,998 B1 | 8/2021 | Castañeda et al. |
| 11,106,342 B1 | 8/2021 | Al Majid et al. |
| 11,126,206 B2 | 9/2021 | Meisenholder et al. |
| 11,143,867 B2 | 10/2021 | Rodriguez, II |
| 11,169,600 B1 | 11/2021 | Canberk et al. |
| 11,227,626 B1 | 1/2022 | Krishnan Gorumkonda et al. |
| 11,307,747 B2 | 4/2022 | Dancie et al. |
| 11,367,416 B1 | 6/2022 | Richter et al. |
| 11,531,402 B1 | 12/2022 | Stolzenberg |
| 11,546,505 B2 | 1/2023 | Canberk |
| 12,008,152 B1 * | 6/2024 | Lucas ................ G06F 3/04815 |
| 2009/0012788 A1 | 1/2009 | Gilbert et al. |
| 2011/0301934 A1 | 12/2011 | Tardif |
| 2014/0171036 A1 | 6/2014 | Simmons |
| 2014/0347391 A1 | 11/2014 | Keane et al. |
| 2015/0120293 A1 | 4/2015 | Wohlert et al. |
| 2015/0370320 A1 | 12/2015 | Connor |
| 2017/0123487 A1 | 5/2017 | Hazra et al. |
| 2017/0277684 A1 | 9/2017 | Dharmarajan Mary |
| 2017/0277685 A1 | 9/2017 | Takumi |
| 2017/0351910 A1 | 12/2017 | Elwazer et al. |
| 2018/0045963 A1 | 2/2018 | Hoover et al. |
| 2018/0158370 A1 | 6/2018 | Pryor |
| 2018/0204469 A1 | 7/2018 | Moster et al. |
| 2019/0282324 A1 | 9/2019 | Freeman et al. |
| 2019/0324720 A1 | 10/2019 | Fallon |
| 2021/0011612 A1 | 1/2021 | Dancie et al. |
| 2021/0074016 A1 | 3/2021 | Li et al. |
| 2021/0166732 A1 | 6/2021 | Shaburova et al. |
| 2021/0174034 A1 | 6/2021 | Retek et al. |
| 2021/0241529 A1 | 8/2021 | Cowburn et al. |
| 2021/0303075 A1 | 9/2021 | Cowburn et al. |
| 2021/0303077 A1 | 9/2021 | Anvaripour et al. |
| 2021/0303140 A1 | 9/2021 | Mourkogiannis |
| 2021/0382564 A1 | 12/2021 | Blachly et al. |
| 2021/0397000 A1 | 12/2021 | Rodriguez, II |
| 2021/0405761 A1 | 12/2021 | Canberk |
| 2022/0101612 A1 | 3/2022 | Palangie et al. |
| 2022/0188539 A1 | 6/2022 | Chan et al. |
| 2022/0206588 A1 | 6/2022 | Canberk et al. |
| 2022/0300730 A1 | 9/2022 | Eirinberg et al. |
| 2022/0300731 A1 | 9/2022 | Eirinberg et al. |
| 2022/0326781 A1 | 10/2022 | Hwang et al. |
| 2022/0334649 A1 | 10/2022 | Hwang et al. |

FOREIGN PATENT DOCUMENTS

| | | |
|---|---|---|
| KR | 20220158824 A | 12/2022 |
| WO | WO-2016168591 A1 | 10/2016 |
| WO | WO-2019094618 A1 | 5/2019 |
| WO | WO-2022005687 A1 | 1/2022 |
| WO | WO-2022005693 A1 | 1/2022 |
| WO | WO-2022060549 A2 | 3/2022 |
| WO | WO-2022066578 A1 | 3/2022 |
| WO | WO-2022132381 A1 | 6/2022 |
| WO | WO-2022146678 A1 | 7/2022 |
| WO | WO-2022198182 A1 | 9/2022 |
| WO | WO-2022216784 A1 | 10/2022 |
| WO | WO-2022225761 A1 | 10/2022 |
| WO | WO-2022245765 A1 | 11/2022 |

OTHER PUBLICATIONS

"U.S. Appl. No. 17/565,321, Non Final Office Action mailed Jul. 13, 2022", 11 pgs.

"U.S. Appl. No. 17/565,321, Notice of Allowance mailed Feb. 6, 2024", 9 pgs.

"U.S. Appl. No. 17/565,321, Notice of Allowance mailed Feb. 13, 2023", 8 pgs.

"U.S. Appl. No. 17/565,321, Notice of Allowance mailed Jul. 7, 2023", 8 pgs.

"U.S. Appl. No. 17/565,321, Notice of Allowance mailed Nov. 3, 2022", 8 pgs.

"U.S. Appl. No. 17/565,321, PTO Response to Rule 312 Communication mailed May 13, 2024", 2 pgs.

"U.S. Appl. No. 17/565,321, Response filed Oct. 13, 2022 to Non Final Office Action mailed Jul. 13, 2022", 10 pgs.

\* cited by examiner

DISTANCE DETERMINATION FOR MIXED REALITY INTERACTION

CLAIM OF PRIORITY

This application is a continuation of U.S. patent application Ser. No. 17/565,321, filed on Dec. 29, 2021, which claims the benefit of priority to U.S. Provisional Application Ser. No. 63/132,784, filed on Dec. 31, 2020, each of which is incorporated herein by reference in its entirety.

TECHNICAL FIELD

Examples of the present disclosure generally relate to determining distances for mixed reality interaction. More particularly, but not by way of limitation, examples of the present disclosure relate to reducing a threshold for determining when a mixed reality interactive item is engaged or activated by a control indicator such as a physical extremity such as a finger or an accessory indicator, such as a wand or hand-held controller.

BACKGROUND

As the popularity of virtual reality (VR), mixed reality (MR), and augmented reality (AR) systems continues to grow, users increasingly interact with virtual media content items that are rendered in the mixed reality environment. These virtual items can include objects, images, animations, or scenes. AR glasses, gloves, and other AR peripheral devices are easily available to users in commerce, and thus, reflect a demand to encourage AR and MR interactions on a global scale.

When interacting with media content items in MR and/or AR, it is important that the user is able to facilitate direct hand-based interaction with an MR object accurately in order to preserve the realistic nature of the MR/AR experience. The ability to create precise interactions with media content items in the MR/AR environment improves interconnectivity and interactivity of the end-user dramatically.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
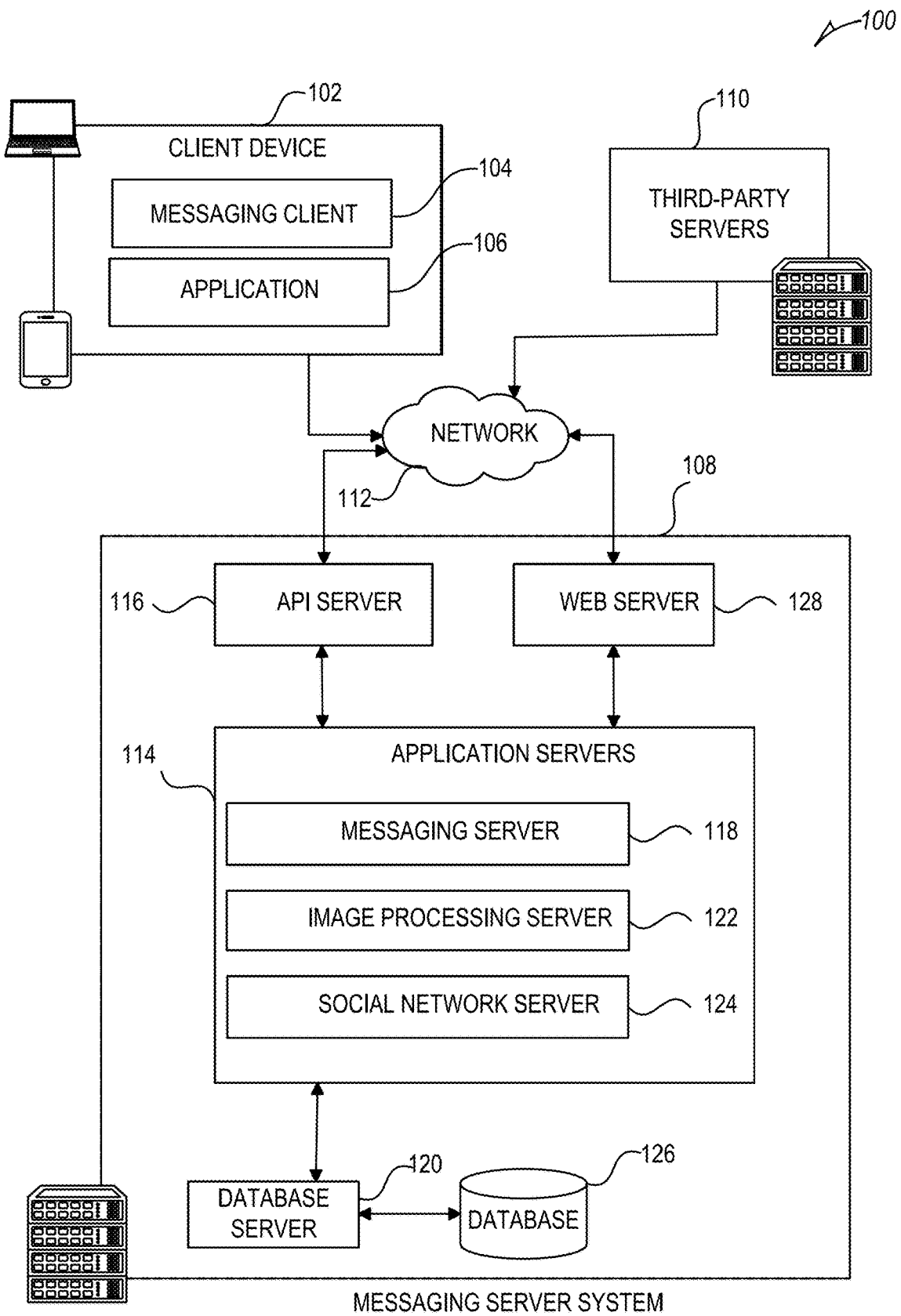
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples of the inventive subject matter. It will be evident, however, to those skilled in the art, that examples of the inventive subject matter may be practiced without these specific details. In general, well-known instruction instances, protocols, structures, and techniques are not necessarily shown in detail.

Users of mobile device interact with virtual objects within a mixed reality, augmented reality, or virtual reality environment utilizing AR glasses, AR headsets, gloves, or other peripheral devices. For example, users interact with VR interactive items or, more specifically, VR interactive controls such as virtual sliders with virtual buttons, virtual icons, virtual objects, virtual images, virtual items, and so forth. A technical problem is how to provide interaction with VR interactive controls where the contact and release of the VR interactive control appear to be crisp to the user. Typically, a VR interactive control is considered to be engaged or activated when a control indicator or control extremity, such as a finger or wand, comes within 1 centimeter of the VR interactive control. However, 1 centimeter often leaves the user dissatisfied with interacting with the VR interactive control. The term control extremity may be used for control indicator. The term control extremity is not meant to be limited to appendages of the user.

Some examples provide a mixed reality environment where the thresholds for determining whether a control indicator or a control extremity has engaged with a VR interactive control are reduced by using contact information with a real surface. The VR interactive control is rendered on a real surface that may be selected by the user, and then when the control extremity such as a finger touches the real surface, a distance or position of the control extremity is determined when the control extremity is closest to the surface. The VR interactive control is part of a mixed reality environment because it mixes objects in the real world, such as a desktop with virtually rendered VR interactive controls. The distance or position of the control extremity is then used to update the position of the surface to provide a more accurate distance or position of the surface, and the threshold for determining when the control indicator or the control extremity engages with the VR interactive control is reduced. The reduction in the threshold provides a crisper or sharper engagement and release of the VR interactive control for the user.

Additionally, some examples update a distance equation, which includes a compensation variable to account for alignment errors of the mobile device. The compensation variable may be adjusted based on more accurately determining the position of the real surface from the contact of the real surface by the control extremity.

Moreover, some examples more accurately determine positions of the surface using the contact position of the control extremity. A real surface may not be flat and may have ridges and valleys as well as obstructions and other objects associated with the surface. The surface is used to render the VR interactive control so that it appears to the user as if the VR interactive control is on the surface. The positional information for when the control extremity contacts the surface may be used to more accurately determine the geography of the surface so the rendered VR interactive control appears to smoothly fit on the surface and so that the threshold for determining when the control extremity engages with the VR interactive control may be reduced.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other applications 106. Each messaging client 104 is communicatively coupled to other instances of the messaging client 104 (e.g., hosted on respective other client devices 102), a messaging server system 108 and third-party servers 110 via a network 112 (e.g., the Internet). A messaging client 104 can also communicate with locally-hosted applications 106 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor and memory intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 3:
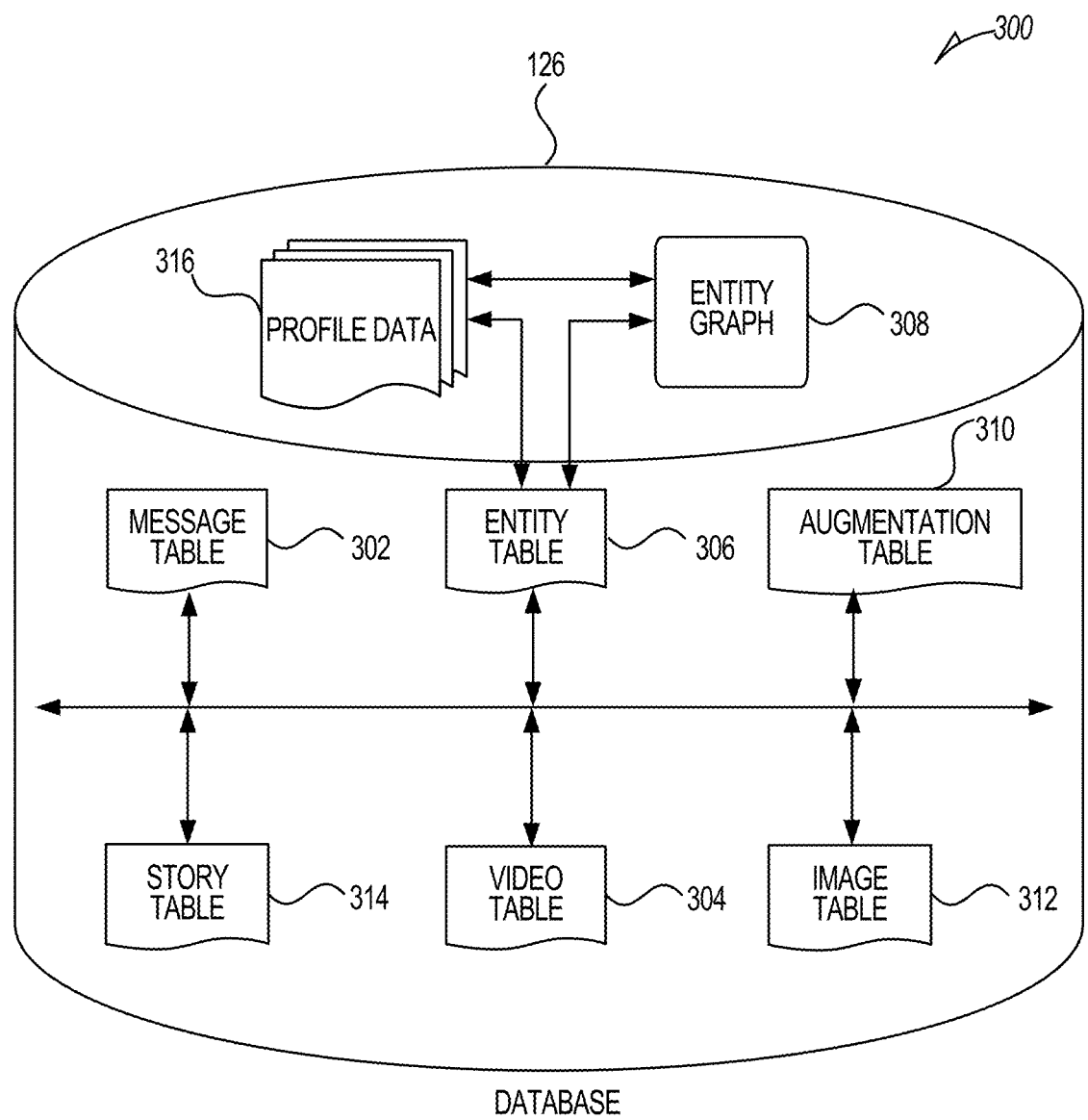
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., an application 106 or applet) are made available to a user via an interface of the messaging client 104. In this context, "external" refers to the fact that the application 106 or applet is external to the messaging client 104. The external resource is often provided by a third party but may also be provided by the creator or provider of the messaging client 104. The messaging client 104 receives a user selection of an option to launch or access features of such an external resource. The external resource may be the application 106 installed on the client device 102 (e.g., a "native app"), or a small-scale version of the application (e.g., an "applet") that is hosted on the client device 102 or remote of the client device 102 (e.g., on third-party servers 110). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource, the messaging client 104 determines whether the selected external resource is a web-based external resource or a locally-installed application 106. In some cases, applications 106 that are locally installed on the client device 102 can be launched independently of and separately from the messaging client 104, such as by selecting an icon, corresponding to the application 106, on a home screen of the client device 102. Small-scale versions of such applications can be launched or accessed via the messaging client 104 and, in some examples, no or limited portions of the small-scale application can be accessed outside of the messaging client 104. The small-scale application can be launched by the messaging client 104 receiving, from a third-party server 110 for example, a markup-language document associated with the small-scale application and processing such a document.

In response to determining that the external resource is a locally-installed application 106, the messaging client 104 instructs the client device 102 to launch the external resource by executing locally-stored code corresponding to the external resource. In response to determining that the external resource is a web-based resource, the messaging client 104 communicates with the third-party servers 110 (for example) to obtain a markup-language document corresponding to the selected external resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using respective messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., applications 106 or applets) to a user to launch or access a given external resource. This list can be presented in a context-sensitive menu. For example, the icons representing different ones of the application 106 (or applets) can vary based on how the menu is launched by the user (e.g., from a conversation interface or from a non-conversation interface).

System Architecture

Figure 2:
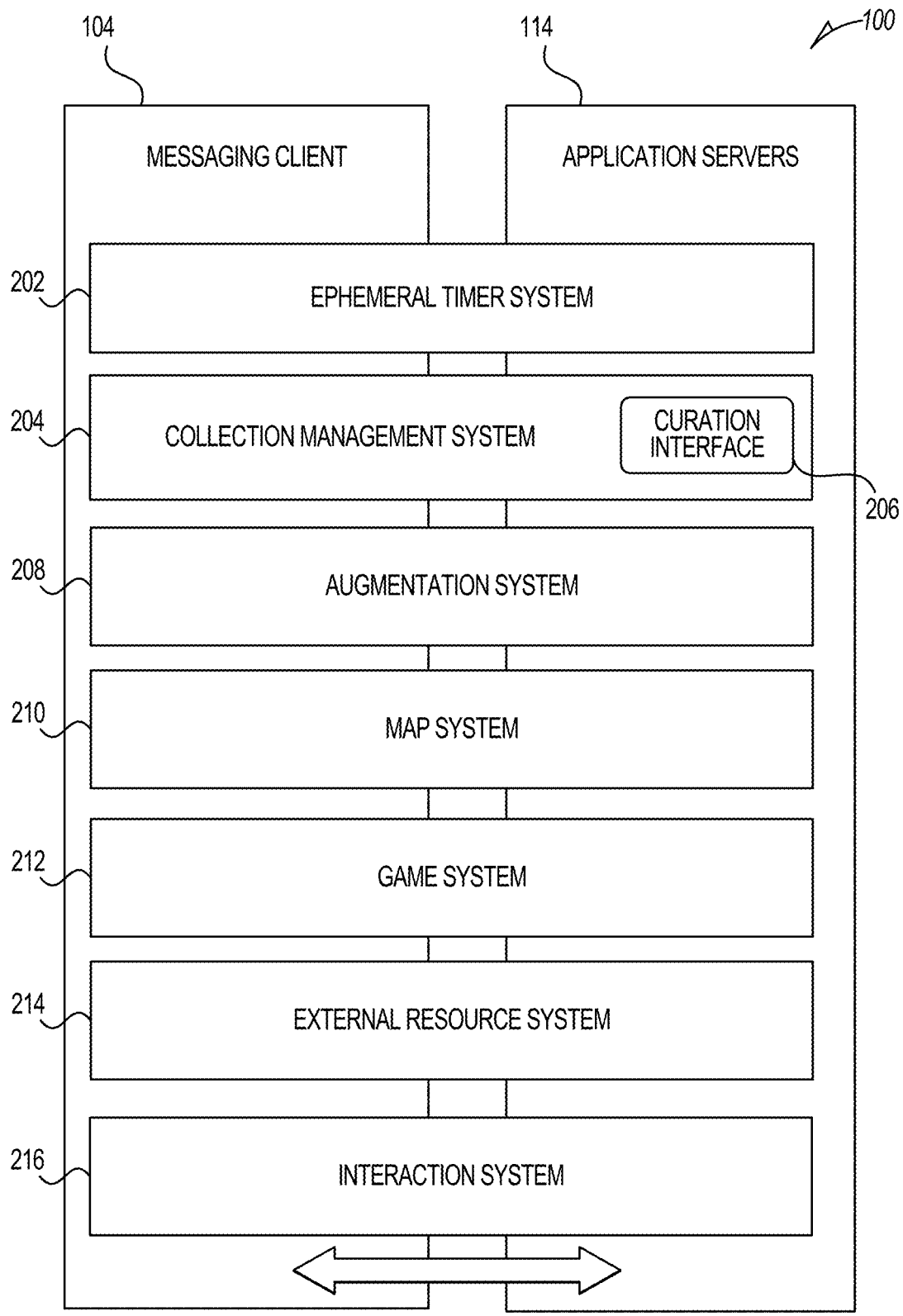
FIG. 2 is a diagrammatic representation of a messaging system, in accordance with some examples, that has both client-side and server-side functionality.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the sever-side by the application servers 114. These subsystems include, for example, an ephemeral timer system 202, a collection management system 204, an augmentation system 208, a map system 210, a game system 212, an external resource system 214, and an interaction system 216.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo, a digital object,) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games that can be launched by a user within the context of the messaging client 104 and played with other users of the messaging system 100. The messaging system 100 further enables a particular user to invite other users to participate in the play of a specific game, by issuing invitations to such other users from the messaging client 104. The messaging client 104 also supports both the voice and text messaging (e.g., chats) within the context of gameplay, provides a leaderboard for the games, and also supports the provision of in-game rewards (e.g., coins and items).

The external resource system 214 provides an interface for the messaging client 104 to communicate with remote servers (e.g., third-party servers 110) to launch or access external resources, i.e., applications or applets. Each third-party server 110 hosts, for example, a markup language (e.g., HTML5) based application or small-scale version of an application (e.g., game, utility, payment, or ride-sharing application). The messaging client 104 may launch a web-based resource (e.g., application) by accessing the HTML5 file from the third-party servers 110 associated with the web-based resource. In certain examples, applications hosted by third-party servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given external resource access to certain user data of the messaging client 104. HTML5 is used as an example technology for programming games, but applications and resources programmed based on other technologies can be used.

In order to integrate the functions of the SDK into the web-based resource, the SDK is downloaded by a third-party server 110 from the messaging server 118 or is otherwise received by the third-party server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., applications 106 or applets and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between third-party servers 110 and the messaging client 104. In certain examples, a Web ViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with third-party servers 110. The SDK limits which information is shared based on the needs of the external resource. In certain examples, each third-party server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale applications (e.g., an application 106) are provided with access to a first type of user data (e.g., only two-dimensional avatars of users with or without different avatar characteristics). As another example, external resources that include small-scale versions of applications (e.g., web-based versions of applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The interaction system 216 provides functions and routines for providing an augmented reality environment. The interaction system 216 provides the functions and routines as described herein and in FIG. 6. The interaction system 216 updates thresholds for determining when a VR interactive control is activated by a control indicator or control extremity such as a finger, pointer, stick, or another appropriate item. The thresholds are updated based on using information obtained when a control extremity touches a real surface where the interaction system 216 has rendered a VR interactive control. The interaction system 216 additionally uses the information to update one or more compensation factors for determining distances between real objects and a mobile device 628 where the interaction system 216 operates. Moreover, the interaction system 216 uses the information to build a position of the surface within a global coordinate system or within a coordinate system based on the location of the mobile device 628.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302 is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas that are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from varies locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end-user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
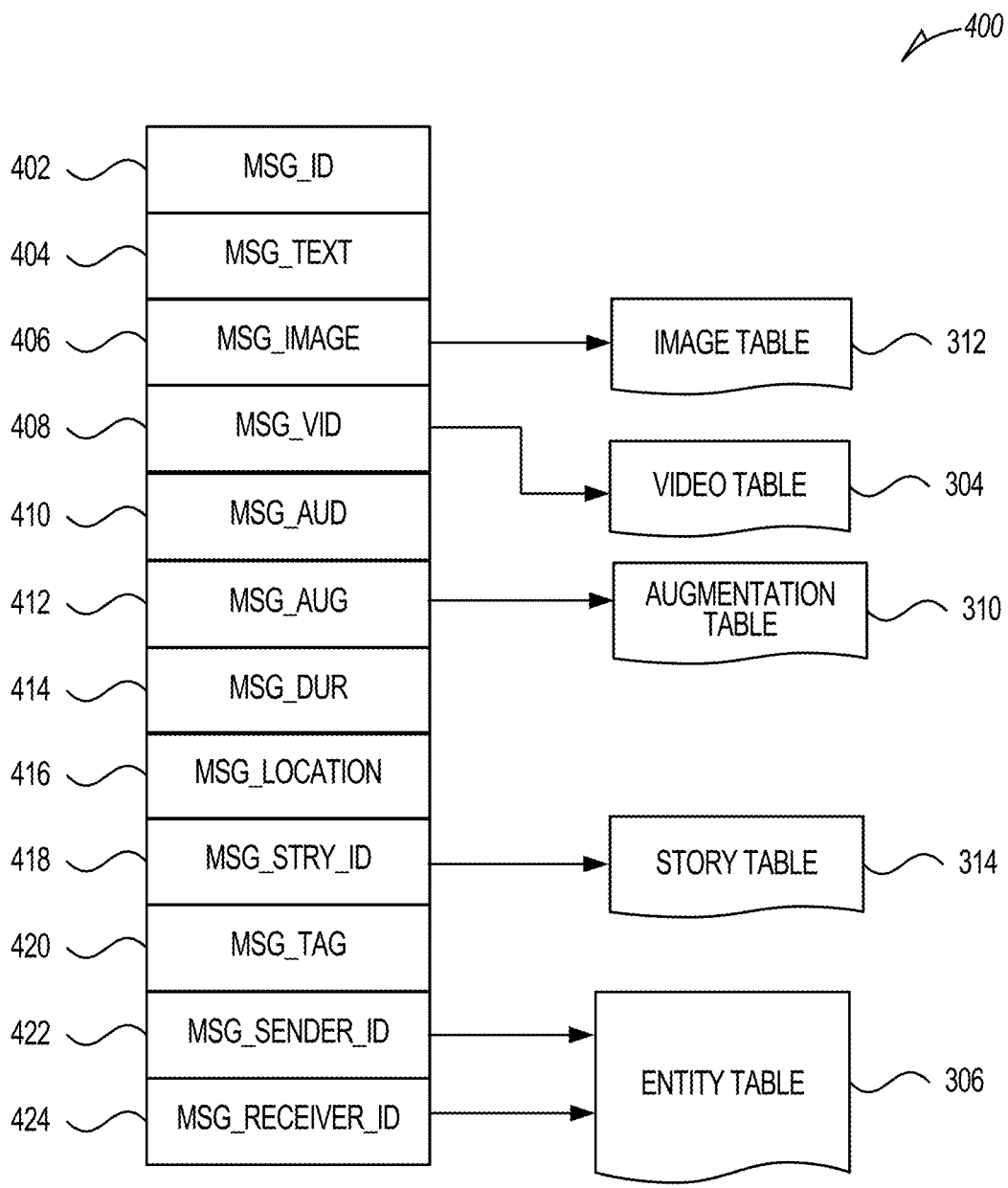
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.
- message sender identifier 422: an identifier (e.g., a messaging system identifier, email address, or device identifier) indicative of a user of the Client device 102 on which the message 400 was generated and from which the message 400 was sent.
- message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentations 412 may point to data stored in an augmentation table 310, values stored within the message story identifier 418 may point to data stored in a story table 314, and values stored within the message sender identifier 422 and the message receiver identifier 424 may point to user records stored within an entity table 306.

Time-Based Access Limitation Architecture

Figure 5:
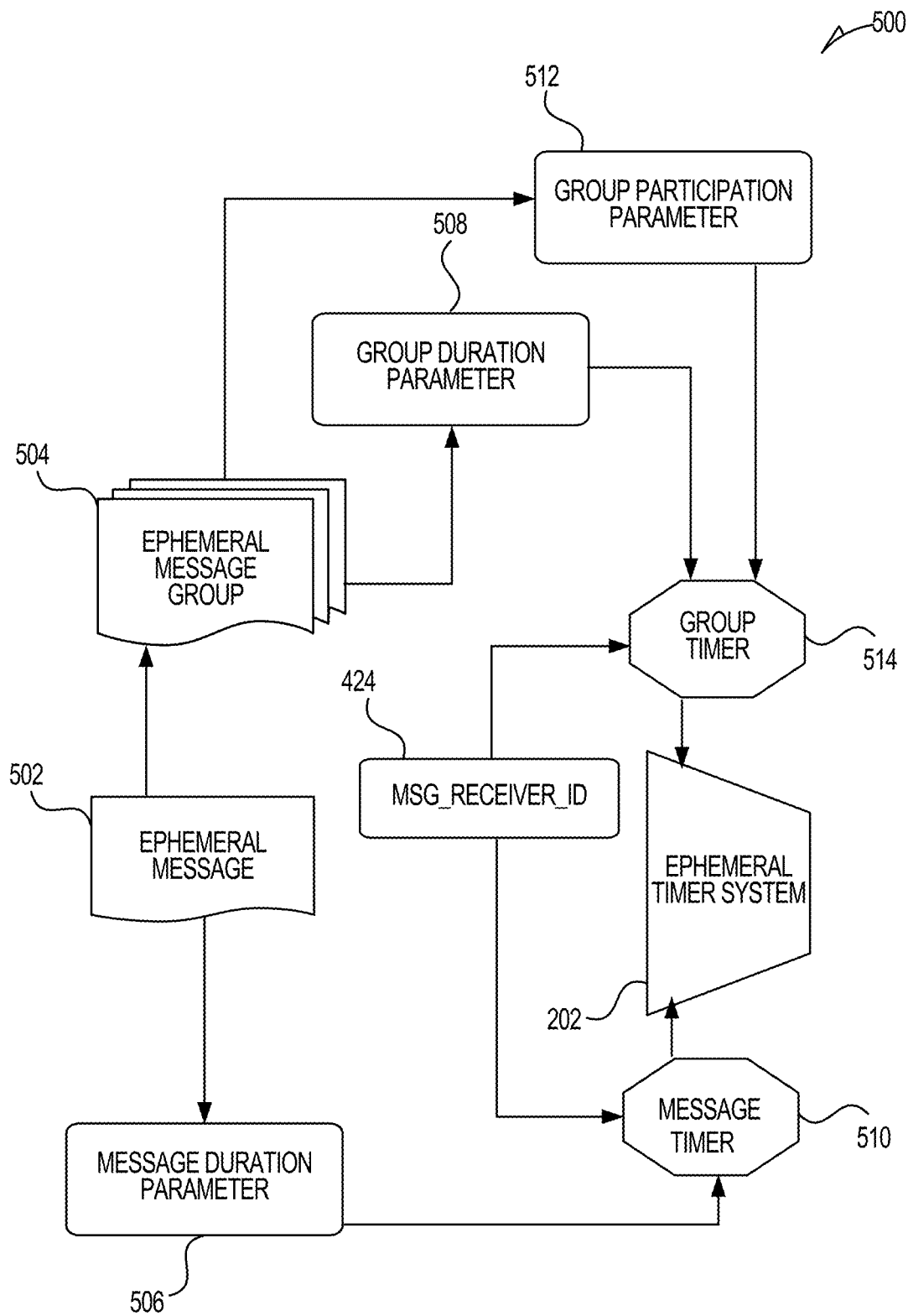
FIG. 5 is a flowchart for an access-limiting process, in accordance with some examples.

FIG. 5 is a schematic diagram illustrating an access-limiting process 500, in terms of which access to content (e.g., an ephemeral message 502, and associated multimedia payload of data) or a content collection (e.g., an ephemeral message group 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client 104. In one example, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 510, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 510 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message group 504 (e.g., a collection of messages in a personal story, or an event story). The ephemeral message group 504 has an associated group duration parameter 508, a value of which determines a time duration for which the ephemeral message group 504 is presented and accessible to users of the messaging system 100. The group duration parameter 508, for example, may be the duration of a music concert, where the ephemeral message group 504 is a collection of content pertaining to that concert. Alternatively, a user (either the owning user or a curator user) may specify the value for the group duration parameter 508 when performing the setup and creation of the ephemeral message group 504.

Additionally, each ephemeral message 502 within the ephemeral message group 504 has an associated group participation parameter 512, a value of which determines the duration of time for which the ephemeral message 502 will be accessible within the context of the ephemeral message group 504. Accordingly, a particular ephemeral message group 504 may "expire" and become inaccessible within the context of the ephemeral message group 504, prior to the ephemeral message group 504 itself expiring in terms of the group duration parameter 508. The group duration parameter 508, group participation parameter 512, and message receiver identifier 424 each provide input to a group timer 514, which operationally determines, firstly, whether a particular ephemeral message 502 of the ephemeral message group 504 will be displayed to a particular receiving user and, if so, for how long. Note that the ephemeral message group 504 is also aware of the identity of the particular receiving user as a result of the message receiver identifier 424.

Accordingly, the group timer 514 operationally controls the overall lifespan of an associated ephemeral message group 504, as well as an individual ephemeral message 502 included in the ephemeral message group 504. In one example, each and every ephemeral message 502 within the ephemeral message group 504 remains viewable and accessible for a time period specified by the group duration parameter 508. In a further example, a certain ephemeral message 502 may expire, within the context of ephemeral message group 504, based on a group participation parameter 512. Note that a message duration parameter 506 may still determine the duration of time for which a particular ephemeral message 502 is displayed to a receiving user, even within the context of the ephemeral message group 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message group 504.

The ephemeral timer system 202 may furthermore operationally remove a particular ephemeral message 502 from the ephemeral message group 504 based on a determination that it has exceeded an associated group participation parameter 512. For example, when a sending user has established a group participation parameter 512 of 24 hours from posting, the ephemeral timer system 202 will remove the relevant ephemeral message 502 from the ephemeral message group 504 after the specified 24 hours. The ephemeral timer system 202 also operates to remove an ephemeral message group 504 when either the group participation parameter 512 for each and every ephemeral message 502 within the ephemeral message group 504 has expired, or when the ephemeral message group 504 itself has expired in terms of the group duration parameter 508.

In certain use cases, a creator of a particular ephemeral message group 504 may specify an indefinite group duration parameter 508. In this case, the expiration of the group participation parameter 512 for the last remaining ephemeral message 502 within the ephemeral message group 504 will determine when the ephemeral message group 504 itself expires. In this case, a new ephemeral message 502, added to the ephemeral message group 504, with a new group participation parameter 512, effectively extends the life of an ephemeral message group 504 to equal the value of the group participation parameter 512.

Responsive to the ephemeral timer system 202 determining that an ephemeral message group 504 has expired (e.g., is no longer accessible), the ephemeral timer system 202 communicates with the messaging system 100 (and, for example, specifically the messaging client 104) to cause an indicium (e.g., an icon) associated with the relevant ephemeral message group 504 to no longer be displayed within a user interface of the messaging client 104. Similarly, when the ephemeral timer system 202 determines that the message duration parameter 506 for a particular ephemeral message 502 has expired, the ephemeral timer system 202 causes the messaging client 104 to no longer display an indicium (e.g., an icon or textual identification) associated with the ephemeral message 502.

Figure 6:
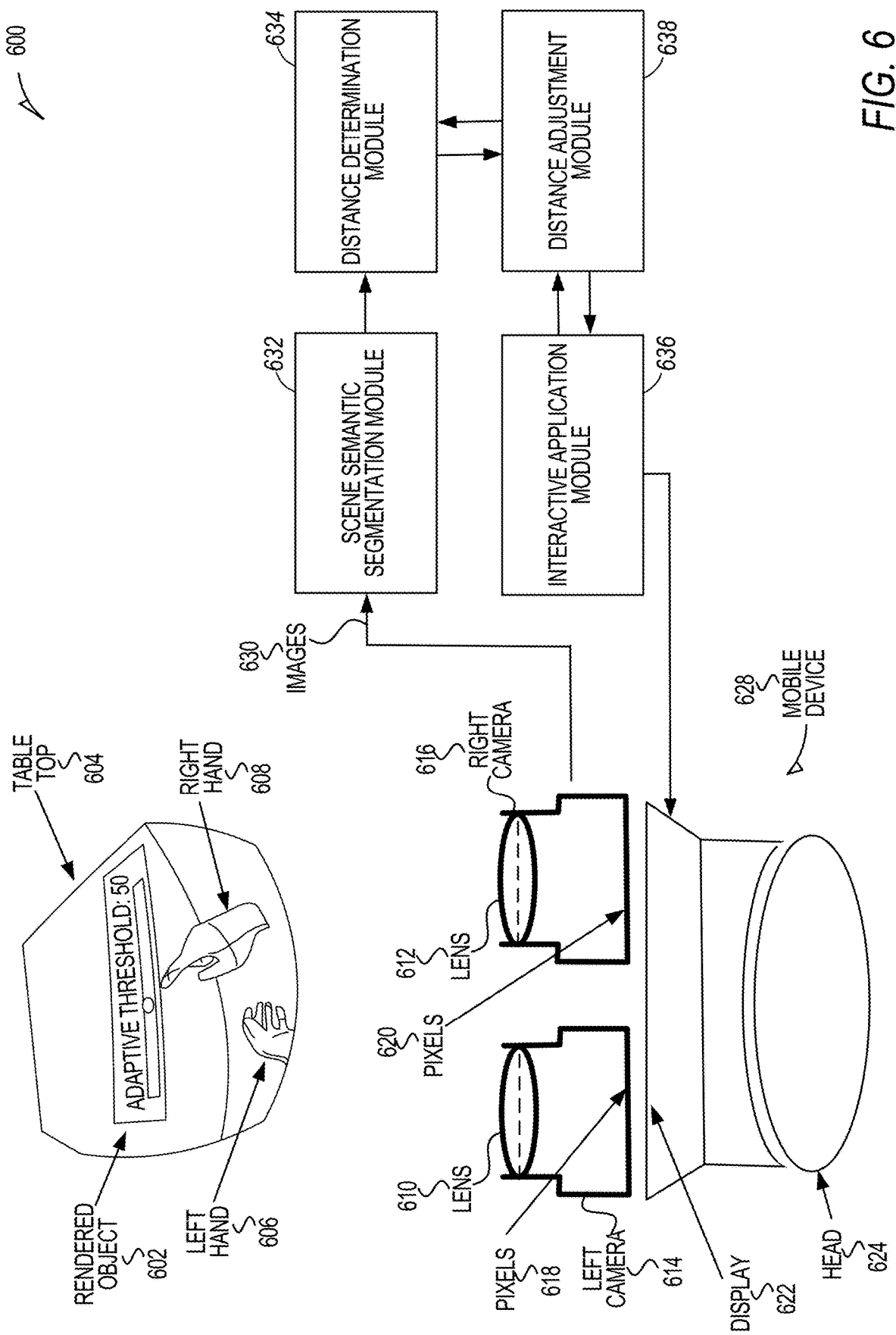
FIG. 6 illustrates a system 600 for distance determination for mixed reality interaction, in accordance with some examples.

FIG. 6 illustrates a system 600 for distance determination for mixed reality interaction, in accordance with some examples. A mobile device 628 includes a left camera 614 and a right camera 616 that are used for capturing images 630 of the objects left hand 606, right hand 608, and tabletop 604. The left camera 614 includes a lens 610 and pixels 618 and generates images 630. The right camera 616 includes a lens 612 and pixels 620 and generates images 630. The interactive application module 636 takes the distance adjustment module 638 that provides distances to objects such as the left hand 606, the right hand 608, and the tabletop 604, and generates rendered object 602, which may be a user interface control or a VR interactive item for the user to interact with. The eyes of a head 624 of the user of the mobile device 628 may see a display 622 where the rendered object 602 is displayed along with the objects left hand 606, right hand 608, and tabletop 604. In some examples, the mobile device 628 may be in the form of glasses where the user sees the real objects left hand 606, right hand 608, and tabletop 604, and where the rendered object 602 is projected on the glasses as described in conjunction with FIG. 11.

The scene semantic segmentation module 632, which is a deep learning neural network that has been trained to detect and classify objects, in accordance with some examples. The distance determination module 634 is based on the detected objects by the scene semantic segmentation module 632. The distance adjustment module 638 takes an initial estimate of a distance or distances and makes adjustments based on measurements taken of an appendage of the user of the mobile device 628, such as the right hand 608. For example, the numbers described in conjunction with graph 1000 of FIG. 1000 are used to adjust the distance or distances.

The distance adjustment module 638 may iterate a number of times with the interactive application module 636 and/or the distance determination module 634 to perform the distance adjustments. In one example, the distance adjustment module 638 uses the data of graph 1000 to estimate alignment compensation (C) of Equation (7) described below.

Figure 7:
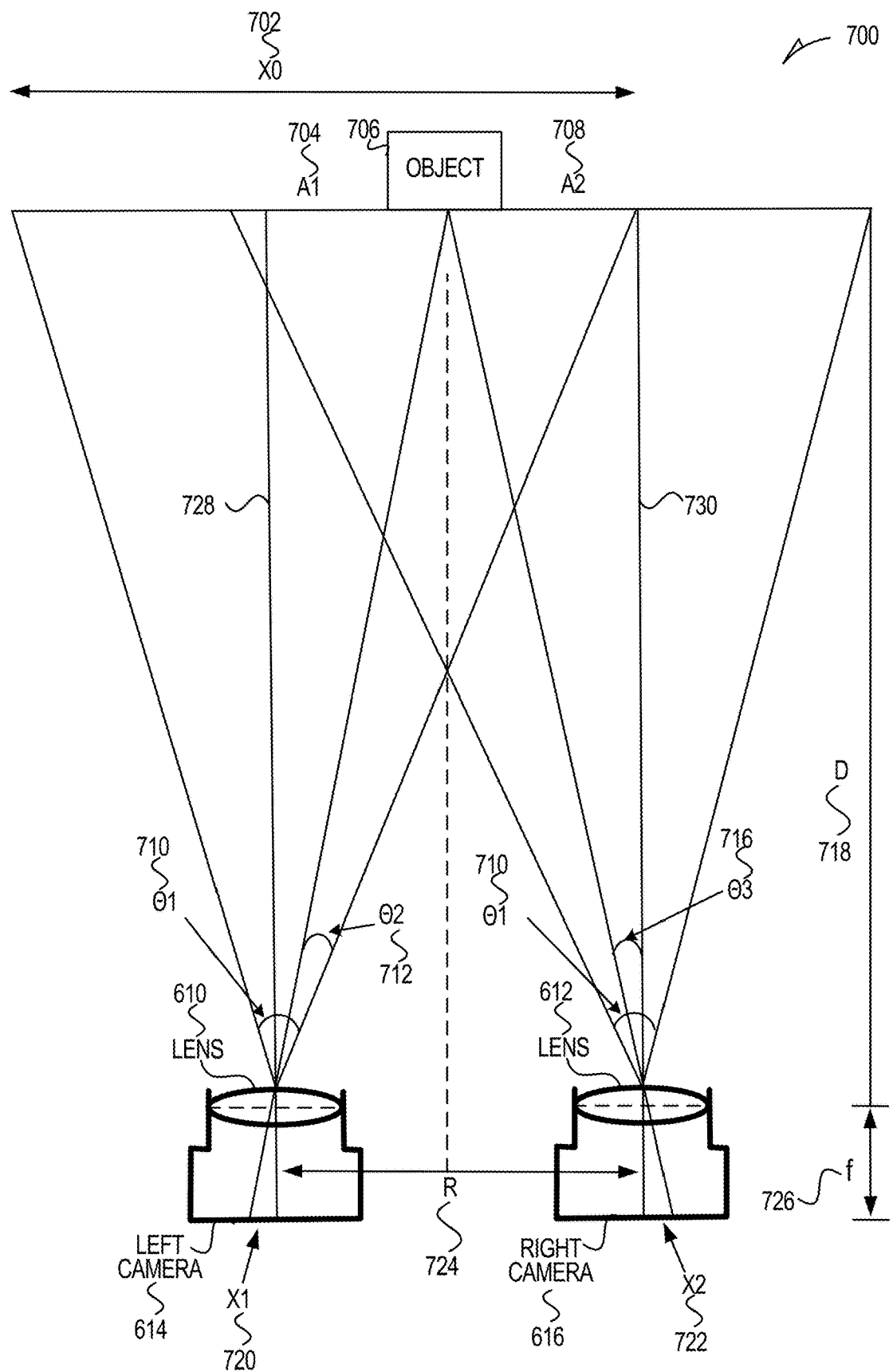
FIG. 7 illustrates a method 700 for distance determination, in accordance with some examples.

FIG. 7 illustrates a method 700 for distance determination, in accordance with some examples. The optical axis 728 of lens 610 of the left camera 614 and the optical axis 730 of lens 612 of the right camera 616 are parallel with one another. The optical axes 728, 730 are at a distance of R 724 from one another. The focal length, f 726, and the view angle, Θ1 710, are the same for both the left camera 614 and the right camera 616. Θ2 712 is the angle between the edge of the Θ1 710 and the object 706 and Θ3 716 is the angle between the optical axis 730 and the object 706.

An image of the object 706 is at a distance of X1 720 from the optical axis 728 of the left camera 614 and at a distance of X2 722 from the optical axis 730 of the right camera 616. Triangulation may be used to derive Equation (1).

$$\frac{A1}{D} = \frac{-X1}{f} \qquad \text{Equation (1)}$$

and $$\frac{A2}{D} = \frac{-X2}{f},$$

where A1 704 and A2 708 are the distances between the optical axes 728, 730, respectively, and the object 706 along a line parallel with the orientation of the lens 610, D is the distance from the object 706 to the center of the lenses 610, 612, respectively. And the equalities of Equation (1) are true because the triangle of A1 704 and D 718 have the same angles as the triangle of −X1 720 and f 726. Similarly, A2 708 and D718 have the same angles as the triangle of −X2 722 and f 726. Additionally, R=A1+A2, which may also be expressed as R 724 is equal to A1 704 plus A2 708, which is used to derive Equation (2) from Equation (1).

Equation (2): R=(D/f)*(X2−X1). And, solving Equation (2) for D derives Equation (3): D=(R*f)/(x2−x1). Additionally, by applying the definition of tangent derives Equation (4): tan(Θ1/2)=(X0/D)=(x1/f), solving for f gives Equation (5): f=X0/(2*tan(Θ1/2)). And substituting Equation (5) into Equation (3) derives the following:

Equation (6): D=(R*X0)/(2*tan(Θ1/2)*(x2−x1)), where X0 702 is the width of the object 706 in the pixels 618 of the left camera 614 and (x2-x1) is the difference between the number of pixels from the optical axes 728, 730. Equation (6) may be used to determine D 718, the distance from the object 706 to the center plane of the lenses 610, 612.

However, alignment errors mean that the view angle Θ1 710 requires an alignment compensation (C), which is included in Equation (7): D=(R*X0)/(2*tan((Θ1/2)+C)*(x2−x1)). There are other methods that are used for determining D 718. The method 700 described in conjunction with FIG. 7 is for a passive determination using at least two cameras for a stereoscopic measuring method. A passive determination means that some type of wave is not sent out to bounce off the object and use the reflection from the object to determine D 718. The distance D 718 may be determined based on a world space or based on a space relative to the mobile device 628.

Figure 8:
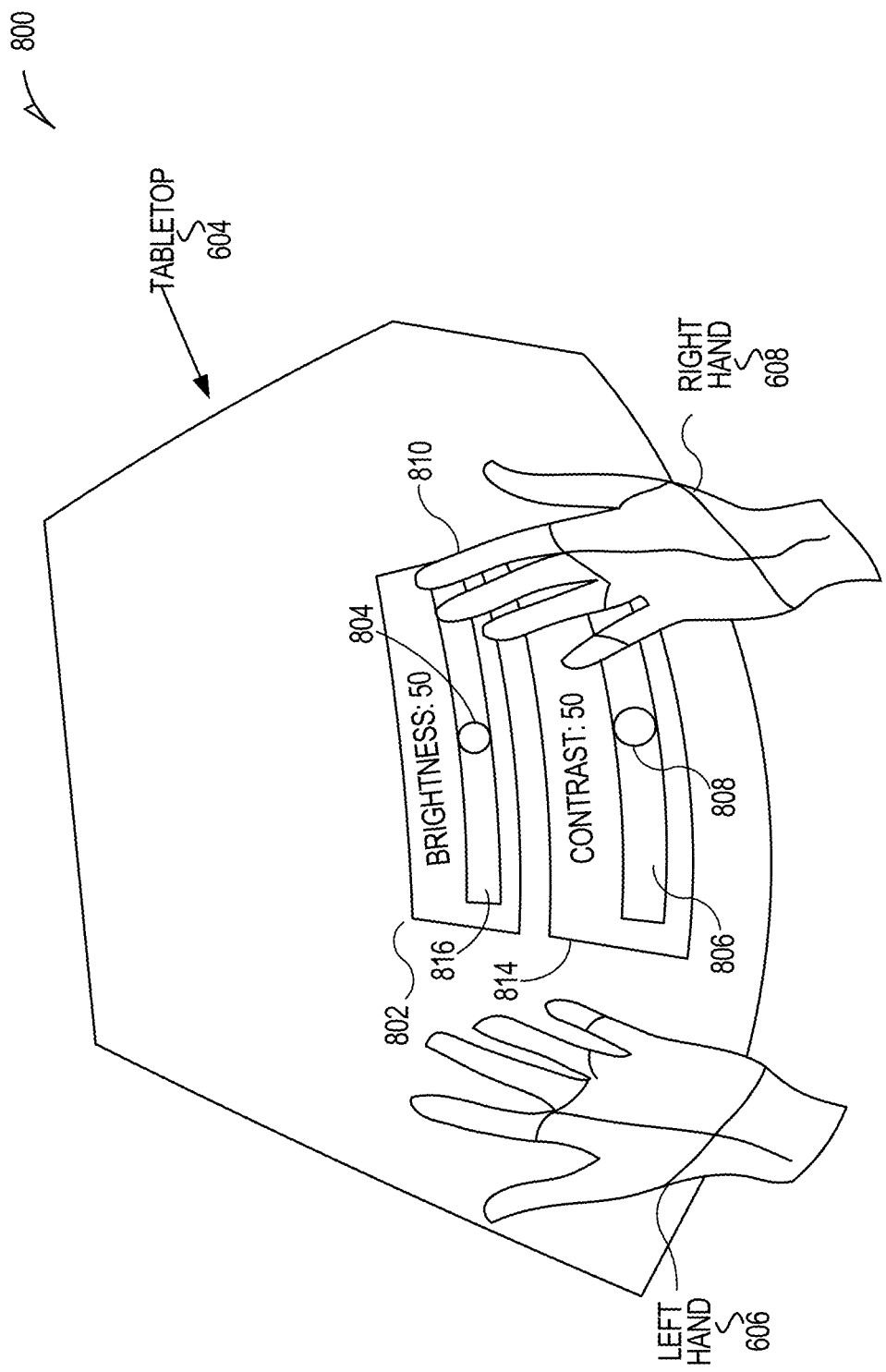
FIG. 8 illustrates a mixed reality scene, in accordance with some examples.

FIG. 8 illustrates a mixed reality scene 800, in accordance with some examples. The tabletop 604 is a real tabletop on which the interactive application module 636 renders rendered objects 602. The area the interactive application module 636 renders rendered objects 602 is termed an interactive area, in accordance with some examples. The rendered objects 602 include left hand 606, right hand 608, brightness control 802, button 804, slide 816, contrast control 814, slide 806, and button 808. The brightness control 802, button 804, and slide 816 are collectively termed a VR interactive item with the button 804, more specifically, termed a VR interactive control, in accordance with some examples. Similarly, for contrast control 814, slide 806, and button 808. In some examples, the left hand 606 and right hand 608 are seen by the user as the real left hand 606 and right hand 608 with the VR rendered objects projected on glasses.

The right hand 608 is termed a control indicator or control extremity. The finger 810 is termed a target extremity and may be an indicator or an extremity extending from the control extremity, such as a finger 810, pen, stylus, or the like, during detecting/tracking in the mixed reality scene. In some examples, the finger 810 is termed a control indicator or a control extremity. In some examples, the control extremity and/or the target extremity are examples of a control indicator. In some examples the right hand 608 and/or the finger 810 are examples of a control indicators. The control extremity and the target extremity are some object or objects that are being controlled by the user.

The distance determination module 634 makes an estimate of the distances of points or planes of the tabletop 604 from the mobile device 628. The scene semantic segmentation module 632 passes to the distance determination module 634 an indication of a surface or object that is the tabletop 604. The distance determination module 634 than uses the information from the scene semantic segmentation module 632 to determine distances. For example, Equation (7) may be used to determine distances of the tabletop 604 from the mobile device 628. The distance determination module 634 converts the distances from the mobile device 628 into a world coordinate system.

The person may wave their left hand 606 and right hand 608 over the tabletop 604 to indicate to the interactive application module 636 to place the VR interactive items on a surface of the tabletop 604.

Figure 9:
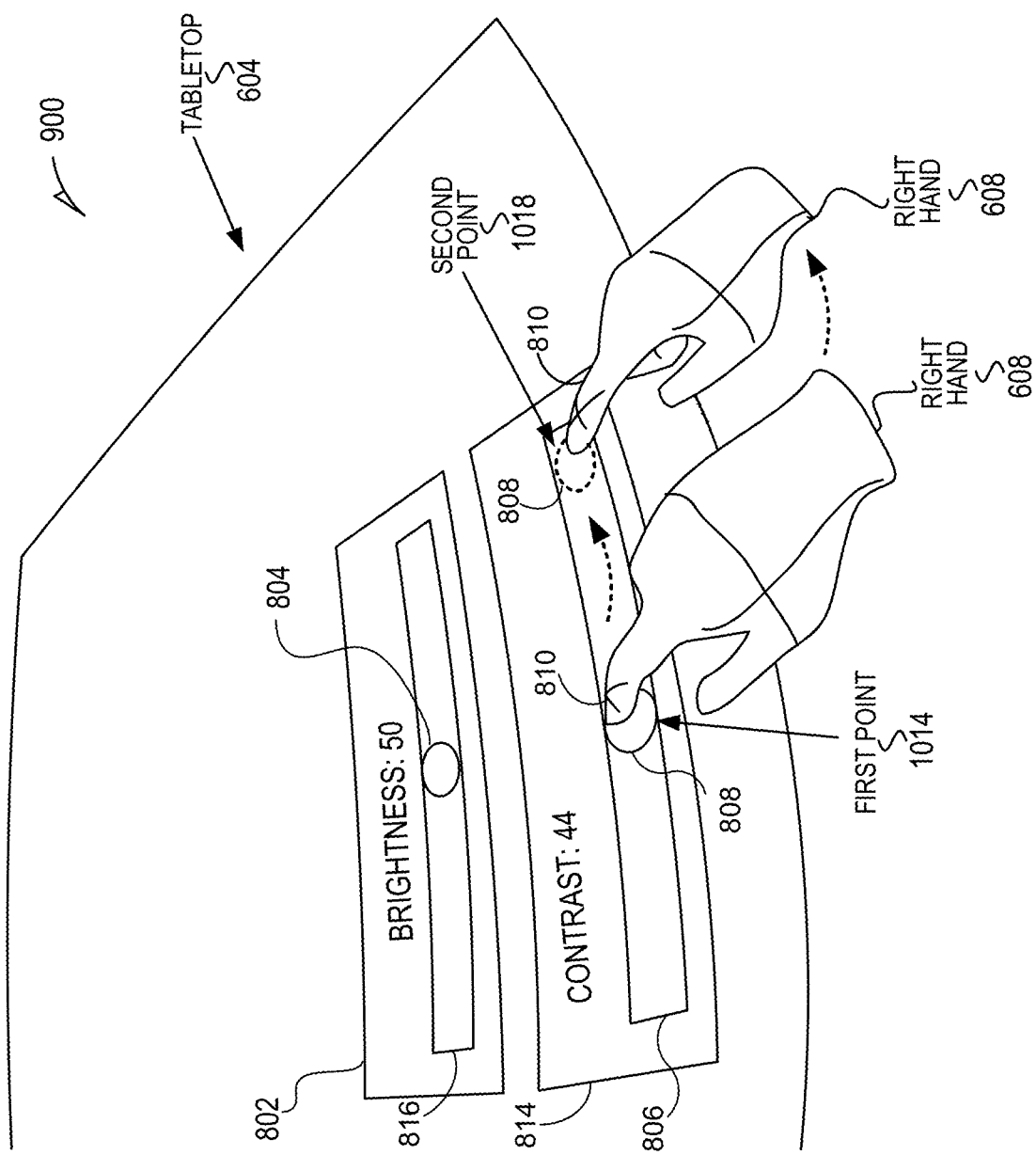
FIG. 9 illustrates a mixed reality scene, in accordance with some examples.

FIG. 9 illustrates a mixed reality scene 900, in accordance with some examples. In FIG. 9, the finger 810 from FIG. 8 has moved to be in contact with the tabletop 604 at the first point 1014, which is where the VR button 808 is rendered. The distance adjustment module 638 uses the information from the finger 810 touching the tabletop 604 to adjust thresholds for determining when the finger 810 is in contact with a VR interactive item and for adjusting the compensation (C) in Equation (7). The first point 1014 and the second point 1018 are points or areas of the tabletop 604 where the VR button 808 is placed. The VR button 808 is activated or engaged at the first point 1014 and then slid down the slide 806 by the finger 810 to the second point 1018. The VR interactive item is rendered simultaneously with the control indicator or the control extremity to move along a predetermined line associated with the VR interactive item.

Figure 10:
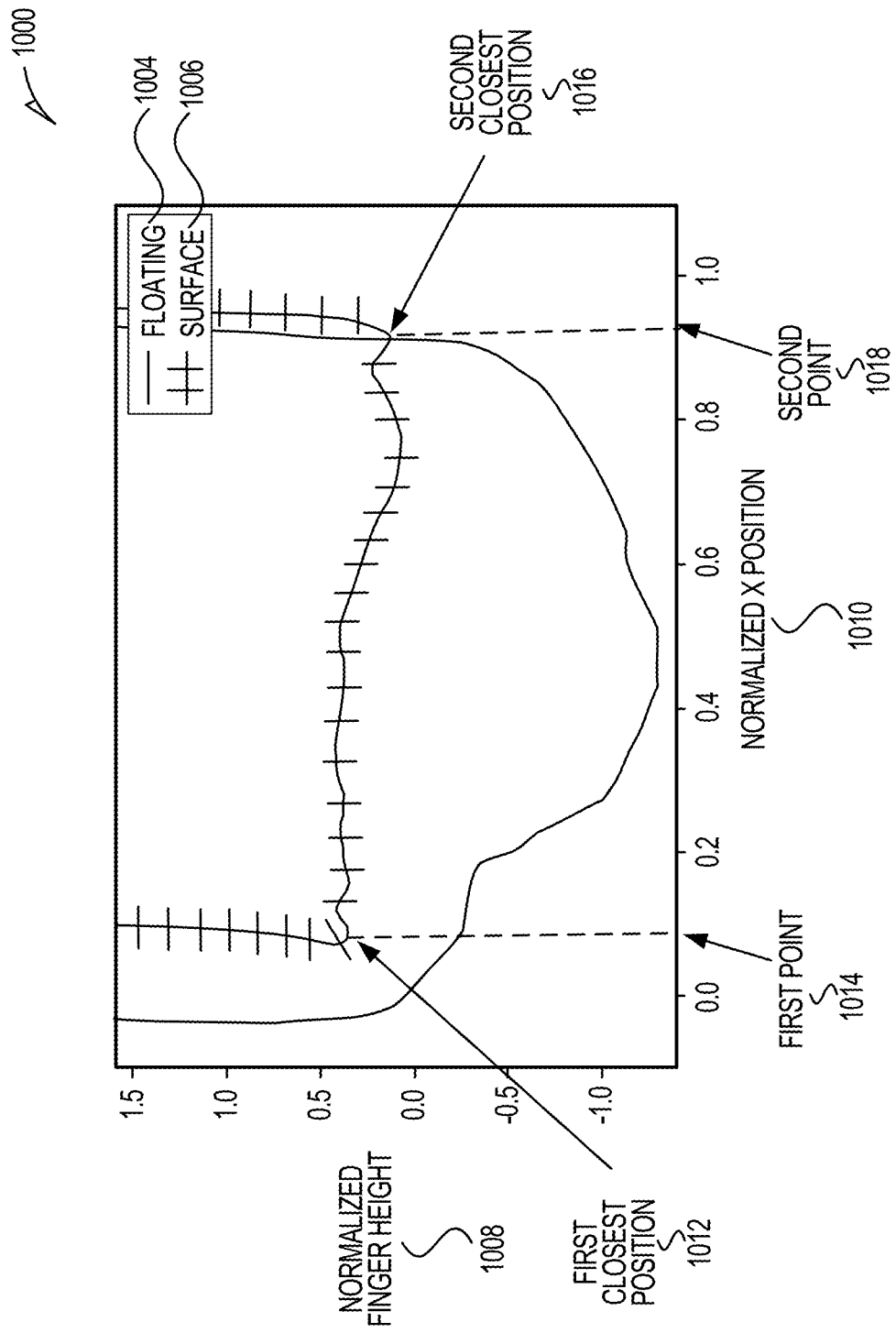
FIG. 10 illustrates a graph comparing finger height vs. position, in accordance with some examples.

FIG. 10 illustrates a graph 1000 comparing finger height, in accordance with some examples. Illustrated in FIG. 10 is normalized finger height 1008 on the vertical axis and normalized X position 1010 on the horizontal axis. The numbers are in centimeters. The graph 1000 illustrates the difference between a floating 1004 VR interactive item compared with a surface 1006 VR interactive item. The floating 1004 is a VR interactive item that is rendered in space and not bound to a physical object. Measurements of the position of the finger 810 relative to the floating 1004 VR interactive item and surface 1006 VR interactive item as measured by the distance determination module 634 are graphed in the graph 1000.

The normalized finger height 1008 is constrained to be positive above "0.0" for the surface 1006 and varies above and below "0.0" for the floating 1004. The floating 1004 has a high variance than the surface 1006. The interactive application module 636 uses the surface 1006 because the variance is lower than the floating 1004 and because the distance adjustment module 638 can iteratively adjust the thresholds for determining when a VR interactive item is being activated or engaged. For floating 1004, the finger 810 may have to move away a full centimeter from the VR interactive item before the interactive application module 636 can determine to deactivate or disengage the VR interactive item such as the button 808.

While a finger 810 can move freely through air for floating, during physical contact with a surface of the tabletop 604, the finger 810 is constrained in its motion. This information is used to more accurately infer the extent of the surface of the tabletop 604, adjust activation thresholds, and correct for systematic errors and offsets in the determination of distances such as is used by Equation (7).

The first point 1014 is where the button 808 is rendered. The distance determination module 634 determines the distance to the first point 1014. The interactive application module 636 renders the VR button 808. The distance determination module 634 tracks the finger 810, which are the surface 1006 data points from the left portion of the graph 1000. The interactive application module 636 actives the VR button 808 when a difference between the first point 1014 and the finger 810 transgresses (e.g., is less than) a first threshold value. The VR button 808 may be activated by, for example, highlighting the VR button 808. The first threshold value may be 0.5 CM to 2.0 CM. For example, the first threshold may be 1 CM. The finger 810 continues to come towards the first point 1014 after the VR button 808 is activated and stops at about 0.35 CM at first closest position 1012. The interactive application module 636 may adjust the position of the first point 1014 or the finger 810 based on a constant associated with the finger. For example, it may be determined that the finger is approximately 0.1 CM in width so that the finger 810 is assumed to be resting on the tabletop 604 at first point 1014 in the graph 1000. The interactive application module 636 may then move the position of the first point 1014 up 0.25 CM so that the finger 810 and first point 1014 are at the same point in space at the position indicated by first point 1014 in the graph 1000.

The interactive application module 636 may then reduce the first threshold for the first point 1014 or areas around the first point 1014 to a second threshold because the accuracy of the distance between the finger 810 and the first point 1014 is greater by the adjustment in the position of the first point 1014. Systematic errors in determining the distances of the finger 810 by the distance determination module 634 will be consistent for subsequent use of the VR button 808, so adjusting the position of the first point 1014 and/or the tabletop 604 to be more accurate relative to the finger 810 enables the lowering of the first threshold. The second threshold may be a value such as 0.01 CM to 0.5 CM, or another value.

For a user of the mobile device 628 lowering the first threshold means that the VR button 808 will be activated only when the finger 810 is closer to the VR button 808. This provides a crisper use of the VR interactive item and provides greater control for the user.

The surface 1006 data points between first point 1014 and second point 1018 are the finger 810 or user sliding the VR button 808 down the VR slide 806 as described in conjunction with FIG. 9. At the second point 1018 the finger 810 moves away from the tabletop 604 where at the second closest position 1016 the finger 810 is about 0.15 CM from the second point 1018. The second threshold is used to determine when to deactivate the VR button 808. The second threshold and the position of the second point 1018 are adjusted in accordance with how the position of the first point 1014 was adjusted and how the first threshold was adjusted.

C of Equation (7): D=(R*X0)/(2*tan((Θ1/2)+C)*(x2−x1)), may be adjusted as follows. The variables for Equation (7) are different for the positions of the finger 810 and the first point 1014 and gave different Ds when the Ds should have been the same when adjusted for the finger width. C is adjusted so that D for the first point 1014 and D for the finger 810 at the first point plus the constant for the width of the finger 810 are the same.

Figure 11:
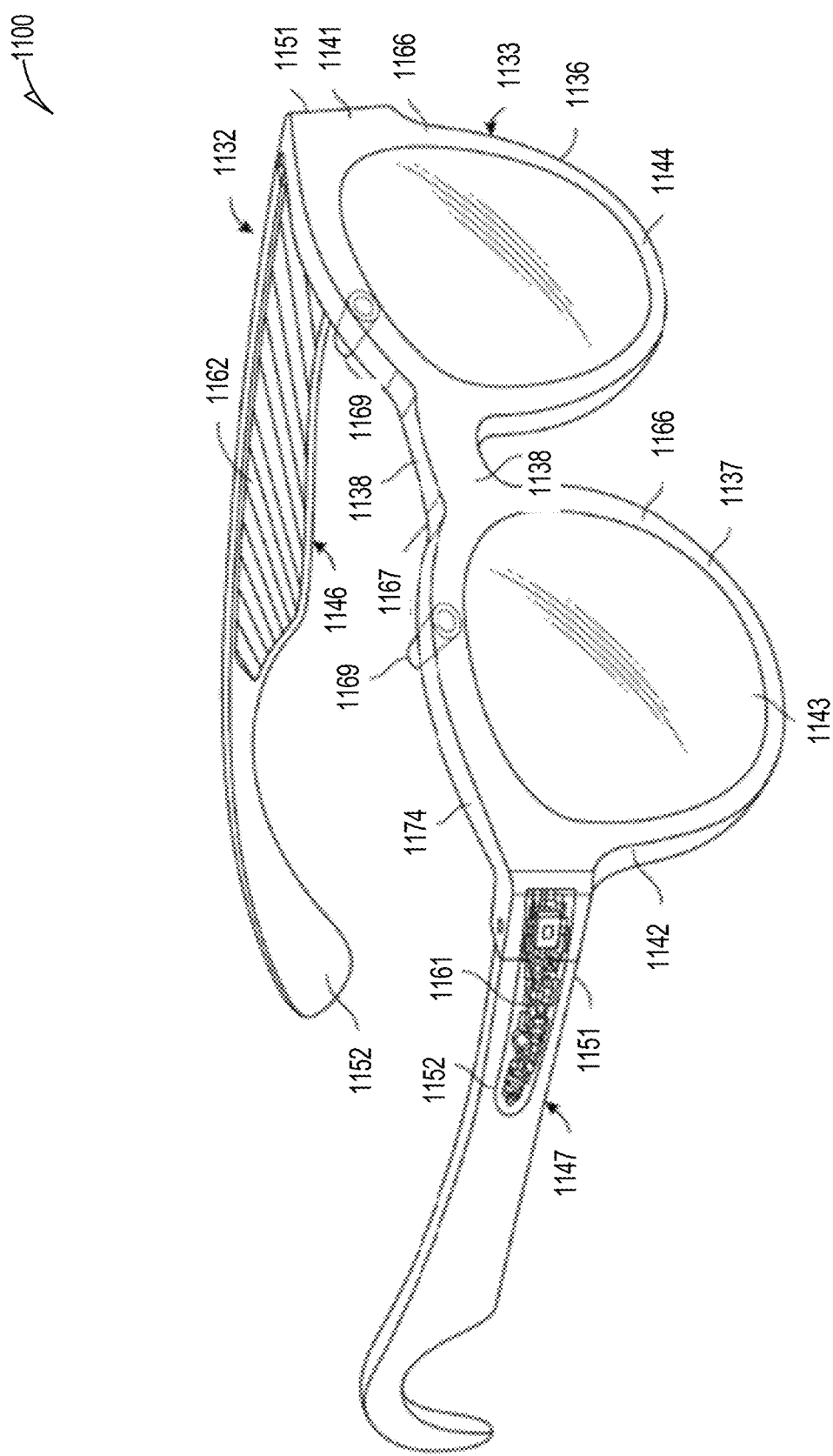
FIG. 11 illustrates a wearable electronic device in the form of glasses, in accordance with some examples.

FIG. 11 illustrates examples of a wearable electronic device in the form of glasses 1100, in accordance with some examples. The wearable electronic device in the form of glasses 1100 is an example of the mobile device 628 being in the example form of an article of eyewear constituted by electronics-enabled glasses 1100, which may further operate within a network system for communicating image and video content with associated location information. FIG. 11 illustrates a front perspective view of the glasses 1100. In some examples, the wearable electronic device is termed AR glasses. The glasses 1100 can include a frame 1132 made from any suitable material such as plastic or metal, including any suitable shape memory alloy. The frame 1132 can have a front piece 1133 that can include a first or left lens, display, or optical element holder 1136 and a second or right lens, display, or optical element holder 1137 connected by a bridge 1138. The front piece 1133 additionally includes a left end portion 1141 and a right end portion 1142. A first or left optical element 1144 and a second or right optical element 1143 can be provided within respective left and right optical element holders 1136, 1137. Each of the optical elements 1143, 1144 can be a lens, a display, a display assembly, or a combination of the foregoing. In some examples, for example, the glasses 1100 are provided with an integrated near-eye display mechanism that enables, for example, display to the user of preview images for visual media captured by cameras 1169 of the glasses 1100.

The frame 1132 additionally includes a left arm or temple piece 1146 and a right arm or temple piece 1147 coupled to the respective left and right end portions 1141, 1142 of the front piece 1133 by any suitable means such as a hinge (not shown), so as to be coupled to the front piece 1133, or rigidly or fixedly secured to the front piece 1133 so as to be integral with the front piece 1133. Each of the temple pieces 1146 and 1147 can include a first portion 1151 that is coupled to the respective end portion 1141 or 1142 of the front piece 1133 and any suitable second portion 1152, such as a curved or arcuate piece, for coupling to the ear of the user. In one example, the front piece 1133 can be formed from a single piece of material, so as to have a unitary or integral construction. In one example, the entire frame 1132 can be formed from a single piece of material so as to have a unitary or integral construction.

The glasses 1100 can include a computing device, such as a computer 1161, which can be of any suitable type so as to be carried by the frame 1132 and, in one example, of a suitable size and shape, so as to be at least partially disposed in one of the temple pieces 1146 and 1147. In one example, the computer 1161 has a size and shape similar to the size and shape of one of the temple pieces 1146, 1147 and is thus disposed almost entirely if not entirely within the structure and confines of such temple pieces 1146 and 1147.

In one example, the computer 1161 can be disposed in both of the temple pieces 1146, 11147. The computer 1161 can include one or more processors with memory, wireless communication circuitry, and a power source. The computer 1161 comprises low-power circuitry, high-speed circuitry, location circuitry, and a display processor. Various other examples may include these elements in different configurations or integrated together in different ways. Additional details of aspects of the computer 61 may be implemented as described with reference to the description that follows.

The computer 1161 additionally includes a battery 1162 or other suitable portable power supply. In one example, the battery 1162 is disposed in one of the temple pieces 1146 or 1147. In the glasses 1100 shown in FIG. 11, the battery 1162 is shown as being disposed in the left temple piece 1146 and electrically coupled using a connection 1174 to the remainder of the computer 1161 disposed in the right temple piece 1147. One or more input and output devices can include a connector or port (not shown) suitable for charging a battery 1162 accessible from the outside of the frame 1132, a wireless receiver, transmitter, or transceiver (not shown), or a combination of such devices.

The glasses 1100 include digital cameras 1169. Although two cameras 1169 are depicted, other examples contemplate the use of a single or additional (i.e., more than two) cameras 1169. For ease of description, various features relating to the cameras 1169 will further be described with reference to only a single camera 1169, but it will be appreciated that these features can apply, in suitable examples, to both cameras 1169. Digital cameras 1169 are the left camera 614 and right camera 616 of FIG. 6.

In various examples, the glasses 1100 may include any number of input sensors or peripheral devices in addition to the cameras 1169. The front piece 1133 is provided with an outward-facing, forward-facing, front, or outer surface 1166 that faces forward or away from the user when the glasses 1100 are mounted on the face of the user, and an opposite inward-facing, rearward-facing, rear, or inner surface 1167 that faces the face of the user when the glasses 1100 are mounted on the face of the user. Such sensors can include inward-facing video sensors or digital imaging modules such as cameras 1169 that can be mounted on or provided within the inner surface 1167 of the front piece 1133 or elsewhere on the frame 1132 so as to be facing the user, and outward-facing video sensors or digital imaging modules such as the cameras 1169 that can be mounted on or provided with the outer surface 1166 of the front piece 1133 or elsewhere on the frame 1132 so as to be facing away from the user. Such sensors, peripheral devices, or peripherals can additionally include biometric sensors, location sensors, accelerometers, or any other such sensors.

The glasses 1100 further include an example of a camera control mechanism or user input mechanism comprising a camera control button mounted on the frame 1132 for haptic or manual engagement by the user. The camera control button provides a bi-modal or single-action mechanism in that it is disposable by the user between only two conditions, namely an engaged condition and a disengaged condition. In this example, the camera control button is a pushbutton that is by default in the disengaged condition, being depressible by the user to dispose it to the engaged condition. Upon release of the depressed camera control button, it automatically returns to the disengaged condition.

In other examples, the single-action input mechanism can instead be provided by, for example, a touch-sensitive button comprising a capacitive sensor mounted on the frame 1132 adjacent to its surface for detecting the presence of a user's finger, to dispose the touch-sensitive button to the engaged condition when the user touches a finger to the corresponding spot on the outer surface 1166 of the frame 1132. It will be appreciated that the above-described camera control button and capacitive touch button are but two examples of a haptic input mechanism for single-action control of the camera 1169, and that other examples may employ different single-action haptic control arrangements.

The computer 1161 is configured to perform the methods described in conjunction with FIGS. 1-16. The computer 1161 is an example of a mobile device 628, in accordance with some examples. In some examples, the computer 1161 is coupled to one or more antennas for reception of signals from a GNSS and circuitry for processing the signals where the antennas and circuitry are housed in the glasses 1100. In some examples, the computer 1161 is coupled to one or more wireless antennas and circuitry for transmitting and receiving wireless signals where the antennas and circuitry are housed in the glasses 1100. In some examples, there are multiple sets of antennas and circuitry housed in the glasses 1100. In some examples, the antennas and circuitry are configured to operate in accordance with a communication protocol such as Bluetooth™, Low-energy Bluetooth™, IEEE 802, IEEE 802.11az/be, and so forth. In some examples, PDR sensors are housed in glasses 1100 and coupled to the computer 1161. In some examples, PDR sensors are housed in glasses 1100 and coupled to the computer 1161. In some examples, the glasses 1100 are VR or AR headsets.

Figure 12:
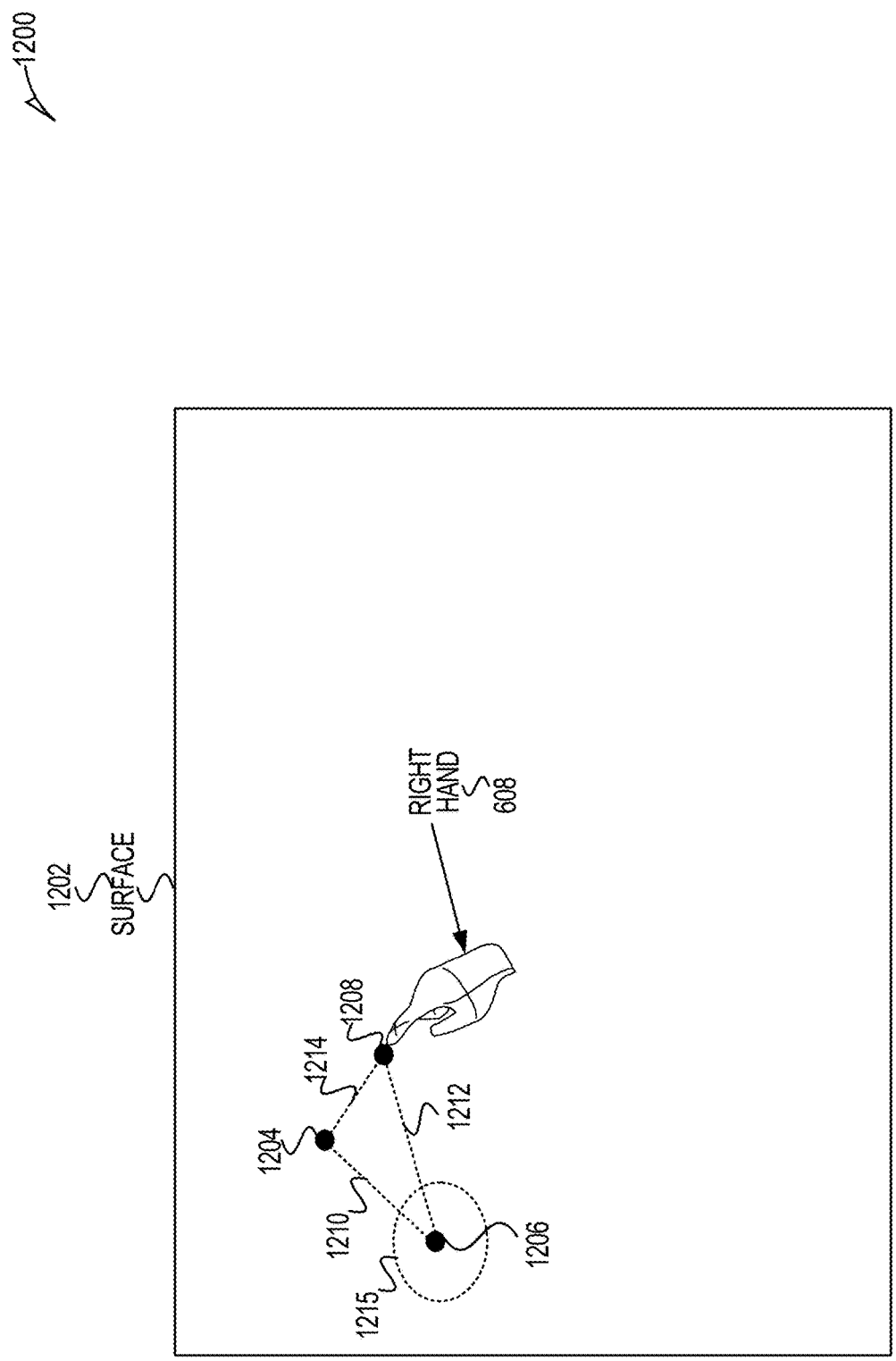
FIG. 12 illustrates a mixed reality scene, in accordance with some examples.

FIG. 12 illustrates a mixed reality scene 1200, in accordance with some examples. The scene semantic segmentation module 632 identifies the surface 1202 and right hand 608. The distance determination module 634 determines initial distance estimates for the surface 1202. The distance adjustment module 638 adjusts the distance estimates based on the right hand 608 interacting with VR interactive items rendered on the surface 1202 by the interactive application module 636. Positions of the surface 1202 may be refined so that a threshold for determining when the right hand 608 or the finger of the right hand 608 activates a VR interactive control.

As illustrated new positions 1204, 1206, and 1208 have been determined based on interaction with the surface 1202 and VR interactive controls. The interactive application module 636 may adjust other positions such as along lines 1210, 1212, and 1214, based on the new positions 1204, 1206, and 1208. In some examples, the distance adjustment module 638 adjusts positions within an area 1215 around a new position 1206.

Figure 13:
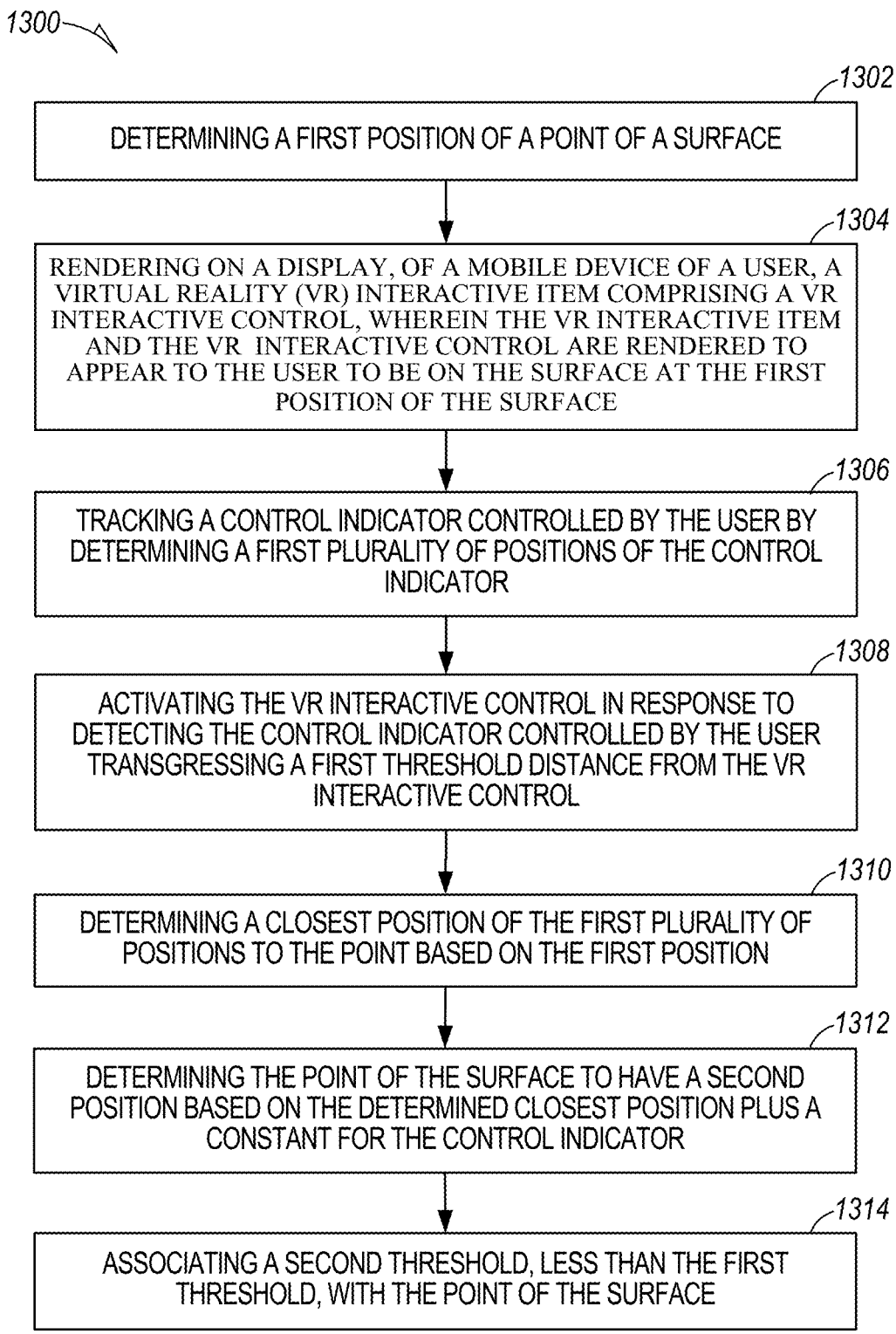
FIG. 13 illustrates a method for determining distances for mixed reality interaction, in accordance with some examples.

FIG. 13 illustrates a method for determining distances for mixed reality interaction, in accordance with some examples. The method 1300 begins at operation 1302 with determining, by one or more processors, a first position of a point of a surface. For example, distance determination module 634 uses Equation (7) to determine a distance from the mobile device 628 to the tabletop 604. The method continues at operation 1304 with rendering on a display, of a mobile device of a user, a virtual reality (VR) interactive item comprising a VR interactive control, wherein the VR interactive item and the VR interactive control are rendered to appear to the user to be on the surface at the first position of the surface; or, rendering on a display, of a mobile device of a user, a virtual reality (VR) interactive item comprising a VR interactive control, wherein the VR interactive item is rendered to appear to the user to be on the surface with the VR interactive control at the first position of the surface. For example, interactive application module 636 renders on a display 622 of the mobile device 628, referring to FIG. 9, brightness control 802, button 804, slide 816, contrast control 814, slide 806, and button 808.

The method 1300 continues at operation 1306 with tracking a control indicator controlled by the user by determining a first plurality of positions of the control indicator. For example, interactive application module 636 tracks the finger 810 of FIG. 9 where the positions of the finger 810 are graphed in graph 1000.

The method 1300 continues at operation 1308 with activating the VR interactive control in response to detecting the control indicator controlled by the user transgressing a first threshold distance from the VR interactive control. For example, the interactive application module 636 activates the button 808 of FIG. 9 in response to the finger 810 pressing on first point 1014 of the tabletop 604.

The method 1300 may continue with rendering on the display an indication that the VR interactive control is activated in response to activating the VR interactive control. For example, button 808 may be rendered to indicate it is activated by brightening the button 808 or darkening the button 808.

The method 1300 continues at operation 1310 with determining a closest position of the first plurality of positions to the point based on the first position. For example, distance adjustment module 638 or interactive application module 636 determines a first closest position 1012 of FIG. 10.

The method 1300 continues at operation 1312 with determining the point of the surface to have a second position based on the determined closest position plus a constant for the control indicator. For example, distance adjustment module 638 adjusts a position or distance of the first point 1014 based on the first closest position 1012 plus a constant for a width of the finger 810.

The method 1300 continues at operation 1314 with associating a second threshold, less than the first threshold, with the point of the surface. For example, the interactive application module 636 reduces a threshold associated with engagement or activating a VR interactive control as disclosed herein.

The method 1300 may include one or more additional operations. Operations of method 1300 may be performed in a different order. One or more of the operations of method 1300 may be optional. The method 1300 may be performed by the client device 102, mobile device 628, and/or the wearable electronic device in the form of glasses 1100. Portions of the functionality may be performed on a server computer or host computer.

Machine Architecture

Figure 14:
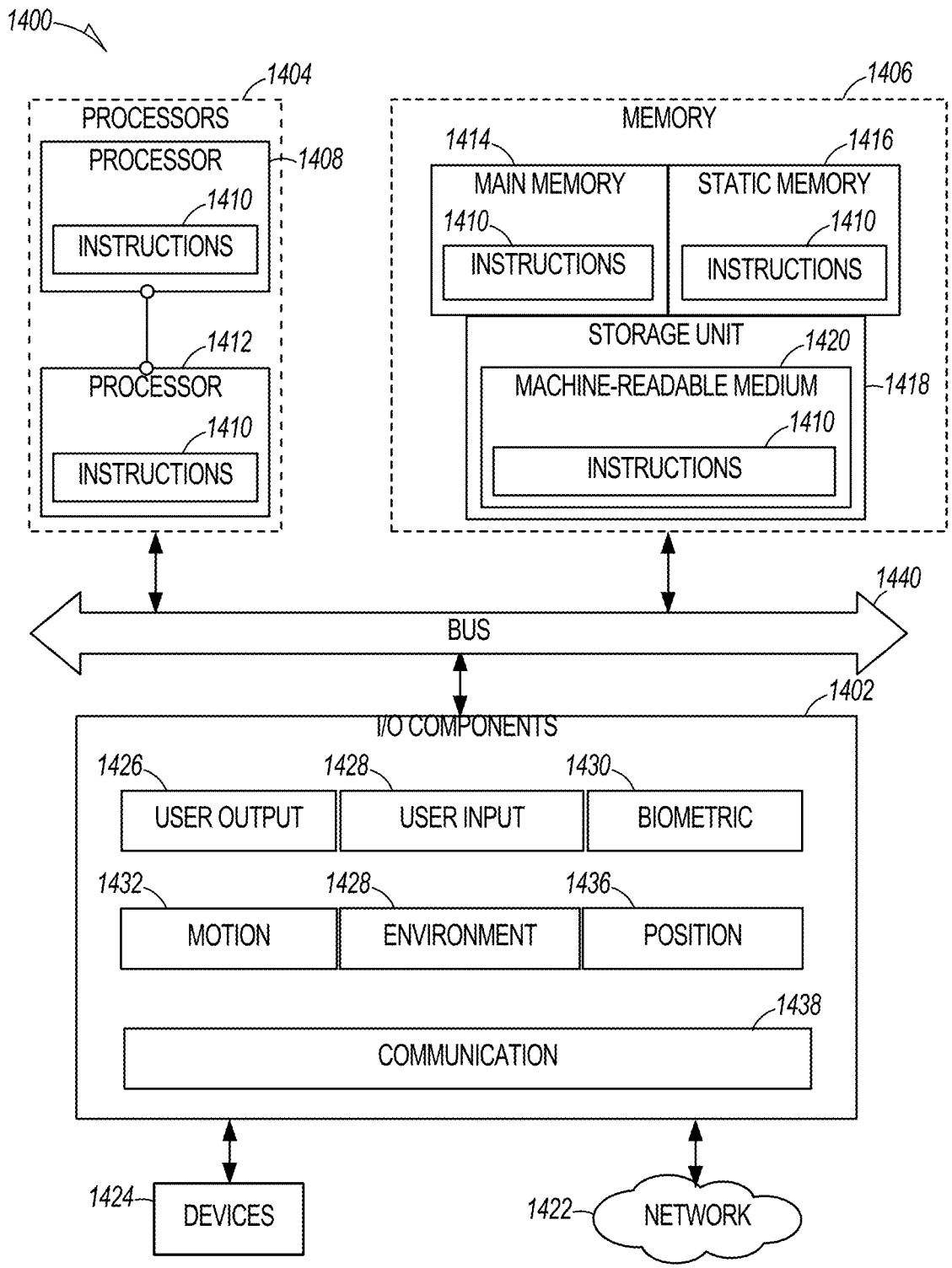
FIG. 14 is a diagrammatic representation of a machine in the form of a computer system within which a set of instructions may be executed for causing the machine to perform any one or more of the methodologies discussed herein, in accordance with some examples.

FIG. 14 is a diagrammatic representation of the machine 1400 within which instructions 1410 (e.g., software, a program, an application, an applet, an app, or other executable code) for causing the machine 1400 to perform any one or more of the methodologies discussed herein may be executed. For example, the instructions 1410 may cause the machine 1400 to execute any one or more of the methods described herein. The instructions 1410 transform the general, non-programmed machine 1400 into a particular machine 1400 programmed to carry out the described and illustrated functions in the manner described. The machine 1400 may operate as a standalone device or may be coupled (e.g., networked) to other machines. In a networked deployment, the machine 1400 may operate in the capacity of a server machine or a client machine in a server-client network environment, or as a peer machine in a peer-to-peer (or distributed) network environment. The machine 1400 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1410, sequentially or otherwise, that specify actions to be taken by the machine 1400. Further, while only a single machine 1400 is illustrated, the term "machine" shall also be taken to include a collection of machines that individually or jointly execute the instructions 1410 to perform any one or more of the methodologies discussed herein. The machine 1400, for example, may comprise the client device 102 or any one of a number of server devices forming part of the messaging server system 108. In some examples, the machine 1400 may also comprise both client and server systems, with certain operations of a particular method or algorithm being performed on the server-side and with certain operations of the particular method or algorithm being performed on the client-side.

The machine 1400 may include processors 1404, memory 1406, and input/output I/O components 1402, which may be configured to communicate with each other via a bus 1440. In an example, the processors 1404 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1408 and a processor 1412 that execute the instructions 1410. The term "processor" is intended to include multi-core processors that may comprise two or more independent processors (sometimes referred to as "cores") that may execute instructions contemporaneously. Although FIG. 14 shows multiple processors 1404, the machine 1400 may include a single processor with a single-core, a single processor with multiple cores (e.g., a multi-core processor), multiple processors with a single core, multiple processors with multiples cores, or any combination thereof.

The memory 1406 includes a main memory 1414, a static memory 1416, and a storage unit 1418, both accessible to the processors 1404 via the bus 1440. The main memory 1406, the static memory 1416, and storage unit 1418 store the instructions 1410 embodying any one or more of the methodologies or functions described herein. The instructions 1410 may also reside, completely or partially, within the main memory 1414, within the static memory 1416, within machine-readable medium 1420 within the storage unit 1418, within at least one of the processors 1404 (e.g., within the Processor's cache memory), or any suitable combination thereof, during execution thereof by the machine 1400.

The I/O components 1402 may include a wide variety of components to receive input, provide output, produce output, transmit information, exchange information, capture measurements, and so on. The specific I/O components 1402 that are included in a particular machine will depend on the type of machine. For example, portable machines such as mobile phones may include a touch input device or other such input mechanisms, while a headless server machine will likely not include such a touch input device. It will be appreciated that the I/O components 1402 may include many other components that are not shown in FIG. 14. In various examples, the I/O components 1402 may include user output components 1426 and user input components 1428. The user output components 1426 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1428 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1402 may include biometric components 1430, motion components 1432, environmental components 1434, or position components 1436, among a wide array of other components. For example, the biometric components 1430 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1432 include acceleration sensor components (e.g., accelerometer), gravitation sensor components, rotation sensor components (e.g., gyroscope).

The environmental components 1434 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1436 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1402 further include communication components 1438 operable to couple the machine 1400 to a network 1422 or devices 1424 via respective coupling or connections. For example, the communication components 1438 may include a network interface Component or another suitable device to interface with the network 1422. In further examples, the communication components 1438 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1424 may be another machine or any of a wide variety of peripheral devices (e.g., a peripheral device coupled via a USB).

Moreover, the communication components 1438 may detect identifiers or include components operable to detect identifiers. For example, the communication components 1438 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1438, such as location via Internet Protocol (IP) geolocation, location via Wi-Fi® signal triangulation, location via detecting an NFC beacon signal that may indicate a particular location, and so forth.

The various memories (e.g., main memory 1414, static memory 1416, and memory of the processors 1404) and storage unit 1418 may store one or more sets of instructions and data structures (e.g., software) embodying or used by any one or more of the methodologies or functions described herein. These instructions (e.g., the instructions 1410), when executed by processors 1404, cause various operations to implement the disclosed examples.

The instructions 1410 may be transmitted or received over the network 1422, using a transmission medium, via a network interface device (e.g., a network interface component included in the communication components 1438) and using any one of several well-known transfer protocols (e.g., hypertext transfer protocol (HTTP)). Similarly, the instructions 1410 may be transmitted or received using a transmission medium via a coupling (e.g., a peer-to-peer coupling) to the devices 1424.

Software Architecture

Figure 15:
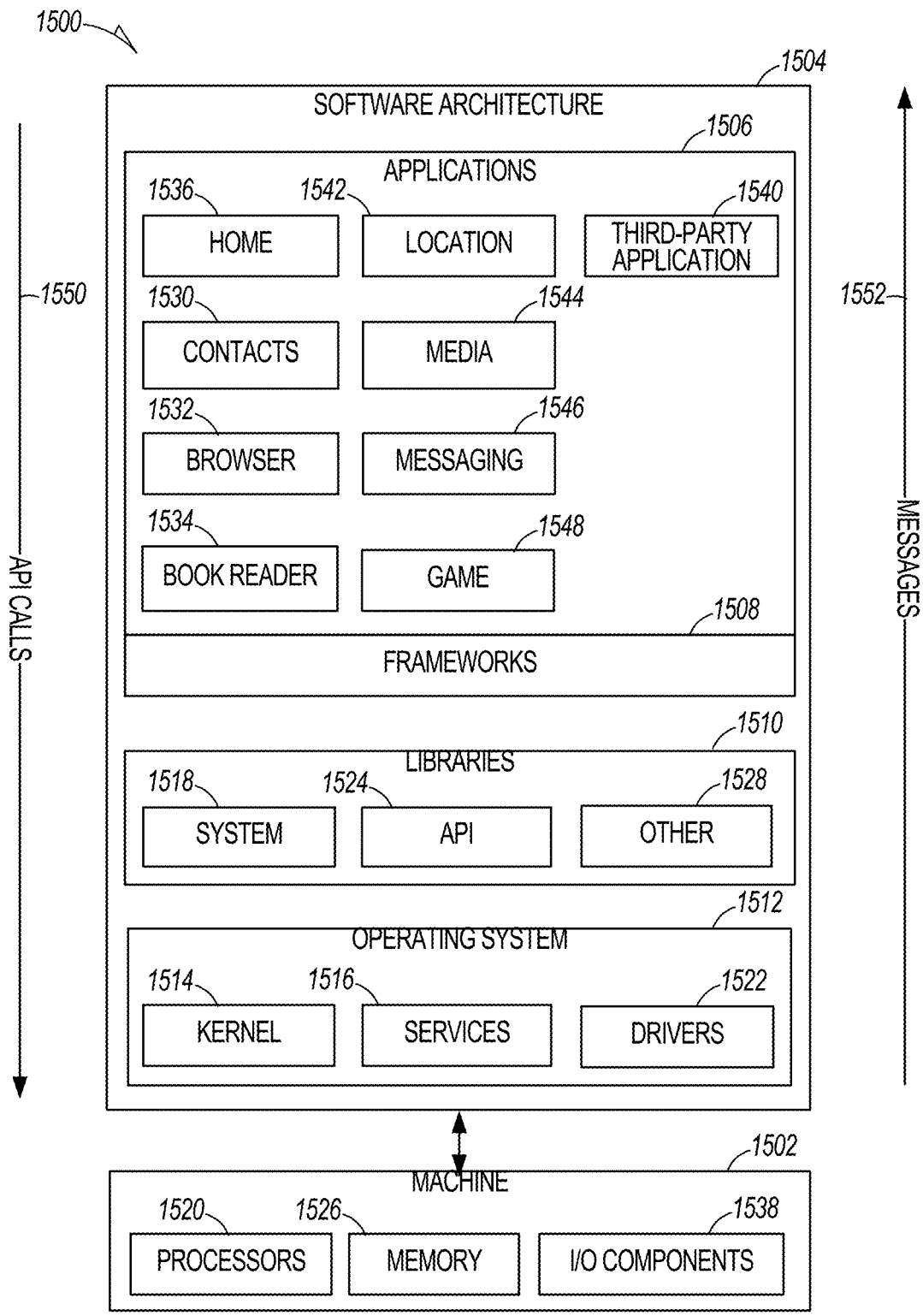
FIG. 15 is a block diagram showing a software architecture within which examples may be implemented.

FIG. 15 is a block diagram 1500 illustrating a software architecture 1504, which can be installed on any one or more of the devices described herein. The software architecture 1504 is supported by hardware such as a machine 1502 that includes processors 1520, memory 1526, and I/O components 1538. In this example, the software architecture 1504 can be conceptualized as a stack of layers, where each layer provides a particular functionality. The software architecture 1504 includes layers such as an operating system 1512, libraries 1510, frameworks 1508, and applications 1506. Operationally, the applications 1506 invoke API calls 1550 through the software stack and receive messages 1552 in response to the API calls 1550.

The operating system 1512 manages hardware resources and provides common services. The operating system 1512 includes, for example, a kernel 1514, services 1516, and drivers 1522. The kernel 1514 acts as an abstraction layer between the hardware and the other software layers. For example, the kernel 1514 provides memory management, processor management (e.g., scheduling), component management, networking, and security settings, among other functionality. The services 1516 can provide other common services for the other software layers. The drivers 1522 are responsible for controlling or interfacing with the underlying hardware. For instance, the drivers 1522 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1510 provide a common low-level infrastructure used by the applications 1506. The libraries 1510 can include system libraries 1518 (e.g., C standard library) that provide functions such as memory allocation functions, string manipulation functions, mathematic functions, and the like. In addition, the libraries 1510 can include API libraries 1524 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1510 can also include a wide variety of other libraries 1528 to provide many other APIs to the applications 1506.

The frameworks 1508 provide a common high-level infrastructure that is used by the applications 1506. For example, the frameworks 1508 provide various graphical user interface (GUI) functions, high-level resource management, and high-level location services. The frameworks 1508 can provide a broad spectrum of other APIs that can be used by the applications 1506, some of which may be specific to a particular operating system or platform.

In an example, the applications 1506 may include a home application 1536, a contacts application 1530, a browser application 1532, a book reader application 1534, a location application 1542, a media application 1544, a messaging application 1546, a game application 1548, and a broad assortment of other applications such as a third-party application 1540. The applications 1506 are programs that execute functions defined in the programs. Various programming languages can be employed to create one or more of the applications 1506, structured in a variety of manners, such as object-oriented programming languages (e.g., Objective-C, Java, or C++) or procedural programming languages (e.g., C or assembly language). In a specific example, the third-party application 1540 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1540 can invoke the API calls 1550 provided by the operating system 1512 to facilitate functionality described herein.

Processing Components

Figure 16:
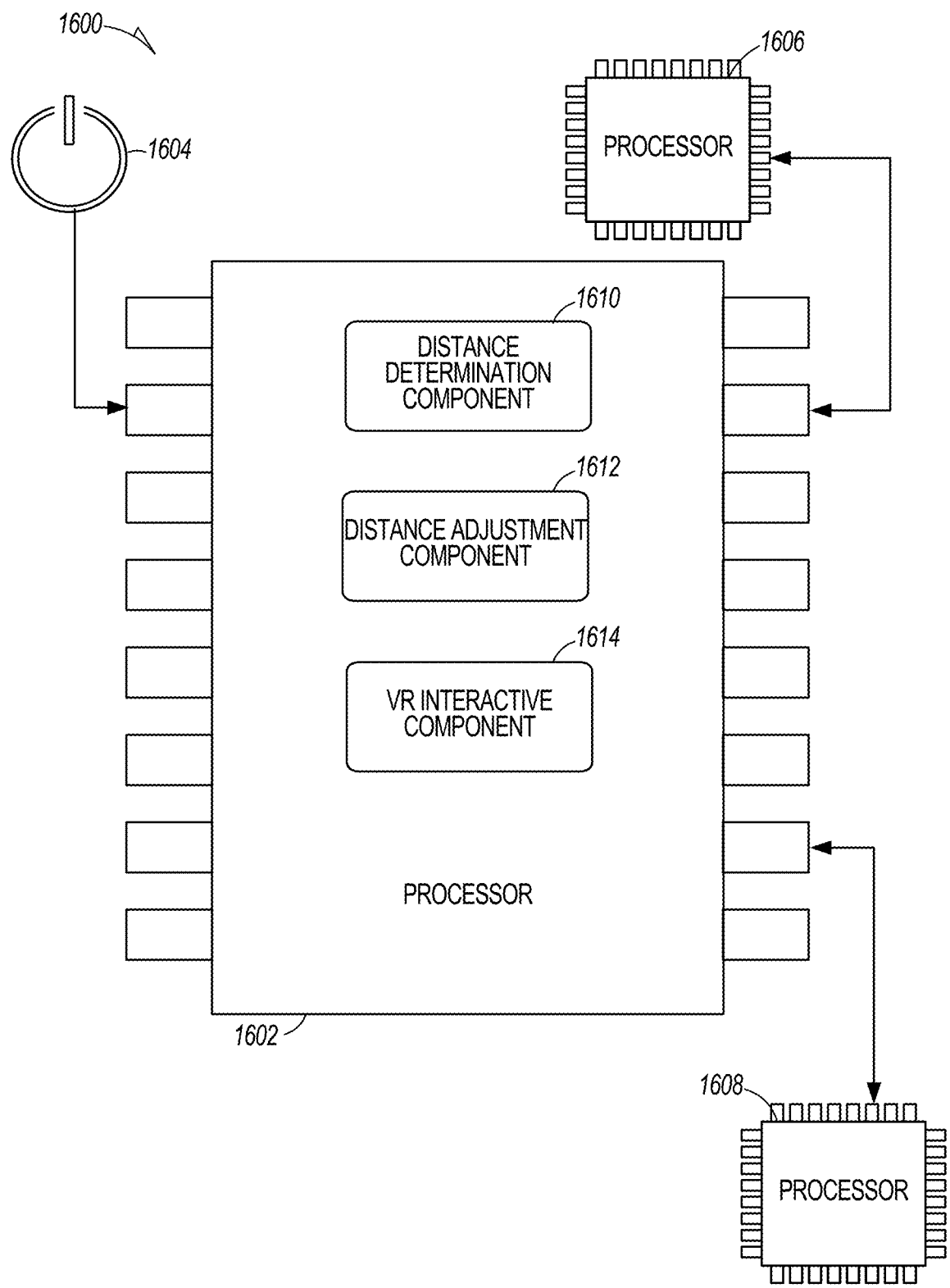
FIG. 16 is a diagrammatic representation of a processing environment, in accordance with some examples.

Turning now to FIG. 16, there is shown a diagrammatic representation of a processing environment 1600, which includes a processor 1602, a processor 1606, and a processor 1608 (e.g., a GPU, CPU or combination thereof).

The processor 1602 is shown to be coupled to a power source 1604, and to include (either permanently configured or temporarily instantiated) modules, namely a distance determination component 1610, distance adjustment component 1612, and a VR interactive component 1614. The distance determination component 1610 uses scene information and images 630, referring to FIG. 6, to determine initial distance determinations. The distance determination component 1610 performs the functions described in conjunction with the distance determination module 634.

The distance adjustment component 1612 takes initial distance information and adjusts the initial distance information based on information provided by the user interacting with VR interactive controls. The distance adjustment component 1612 may adjust equations that are used for determining distance such as C in Equation (7). The distance adjustment component 1612 performs the functions described in conjunction with the distance adjustment module 638.

VR interactive component 1614 operates a mixed reality environment by tracking a control indicator and rendering VR interactive items. The VR interactive component 1614 maintains and adjusts thresholds for determining when a control indicator has engaged with a VR interactive control. The VR interactive component 1614 builds a model of the real world and renders VR components for a user to interact with. The VR interactive component 1614 performs the functions described in conjunction with the interactive application module 636. As illustrated, the processor 1602 is communicatively coupled to both the processor 1606 and the processor 1608.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A mobile device comprising:
one or more processors; and
one or more memories storing instructions that, when executed by the one or more processors, configure the mobile device to perform operations comprising:
determining a first position of a surface of a physical object based on an image from a first camera, an image from a second camera of the mobile device, and based on $(R*X0)/(2*\tan((\Theta 1/2)+C)*(x2-x1))$, where R is an optical distance between an optical axis of the first camera and an optical axis of the second camera, X0 is a width of a point of the surface in pixels of an image sensor of the first camera, x2 is based on a number of pixels from the optical axis of the image sensor of the second camera, x1 is based on a number of pixels from the optical axis of the first camera, $\odot 1$ is a view angle of the first camera and the second camera, and C is a compensation for distortions of the mobile device;
generating, based on the first position, an augmented reality (AR) interactive control, wherein the AR interactive control is generated to appear to a user of the mobile device to be on the surface;
displaying on a display, of the mobile device, the AR interactive control;
determining a first plurality of positions of a control indicator controlled by a user;
activating the AR interactive control in response to detecting a position of the first plurality of positions of the control indicator controlled by the user transgresses a first threshold distance from the AR interactive control; and
displaying on the display an indication that the AR interactive control is activated in response to activating the AR interactive control.

2. The mobile device of claim 1, wherein the operations further comprise:
determining a closest position of the first plurality of positions to the first position of the surface;
determining the surface to have a second position based on the determined closest position plus a constant for the control indicator; and
associating a second threshold distance, less than the first threshold distance, with the second position of the surface.

3. The mobile device of claim 2, wherein the operations further comprise:
deactivating the AR interactive control in response to detecting a position of the control indicator no longer transgressing the second threshold distance.

4. The mobile device of claim 3, further comprising:
reactivating the AR interactive control in response to detecting a position of the control indicator transgresses the second threshold distance.

5. The mobile device of claim 2, wherein the AR interactive control comprises an AR interactive item, and wherein the operations further comprise:
rendering on the display the AR interactive item, wherein the AR interactive item and the AR interactive control are rendered to appear to the user to be on the surface at the second position of the surface; and
activating the AR interactive control in response to detecting the control indicator transgressing the second threshold distance from the AR interactive item.

6. The mobile device of claim 2, wherein the closest position is a first closest position and wherein the operations further comprise:
tracking the control indicator by determining a second plurality of positions of the control indicator;
determining a closest second position of the second plurality of positions to the surface;
determining the surface to have a third position based on the determined closest second position plus the constant for the control indicator; and
associating a third threshold distance, less than the second threshold distance, with the surface.

7. The mobile device of claim 2 wherein the control indicator is a finger of the user, a pen, a pointer, a wand, or a stick, and wherein a constant for the control indicator is a value between 0.1 centimeters and two centimeters.

8. The mobile device of claim 2, wherein the operations further comprise:
adjusting C based on a difference between the first position and the second position.

9. The mobile device of claim 2, wherein a point of the surface is a first point and wherein the operations further comprise:
determining a plurality of closest positions of the first plurality of positions to a plurality of positions of a line along the surface associated with an AR interactive item of the AR interactive control;
determining new positions for the plurality of positions of the line based on a corresponding closest position of the plurality of closest positions plus the constant for the control indicator; and
associating the second threshold distance with the plurality of positions of the line.

10. The mobile device of claim 9, wherein the line along the surface is a slider and the AR interactive control is a virtual button, a virtual icon, a virtual object, a virtual image, or a virtual item.

11. The mobile device of claim 9, wherein the first threshold distance is a value between 0.5 centimeters and 2 centimeters and the second threshold distance is a value between 0.5 centimeters and 0.01 centimeters.

12. The mobile device of claim 1, wherein the first position of the surface is determined based on a point of the surface.

13. The mobile device of claim 12, wherein the point is an area of the surface.

14. The mobile device of claim 1, wherein the operations further comprise:
accessing an activation of the AR interactive control;
rendering an AR interactive item of the AR interactive control to be highlighted;
rendering the AR interactive item to move simultaneously with the control indicator along a predetermined line associated with the AR interactive item;
accessing a deactivation of the AR interactive control; and
rendering the AR interactive item to not be highlighted.

15. The mobile device of claim 14, wherein the operations further comprise:
adjusting the first position of the surface based on the determined first position plus a constant for the control indicator.

16. A non-transitory computer-readable storage medium, the non-transitory computer-readable storage medium including instructions that when executed by a mobile device, cause the mobile device to perform operations comprising:

determining, a first position of a surface of a physical object based on an image from a first camera, an image from a second camera of the mobile device, and based on $(R*XO)/(2*\tan((\Theta 1/2)+C)*(x2-x1))$, where R is an optical distance between an optical axis of the first camera and an optical axis of the second camera, XO is a width of a point of the surface in pixels of an image sensor of the first camera, x2 is based on a number of pixels from the optical axis of the image sensor of the second camera, x1 is based on a number of pixels from the optical axis of the first camera, $\Theta 1$ is a view angle of the first camera and the second camera, and C is a compensation for distortions of the mobile device;
generating, based on the first position, an augmented reality (AR) interactive control, wherein the AR interactive control is generated to appear to a user of the mobile device to be on the surface;
displaying on a display, of the mobile device, the AR interactive control;
determining a first plurality of positions of a control indicator controlled by a user;
activating the AR interactive control in response to detecting a position of the first plurality of positions of the control indicator controlled by the user transgresses a first threshold distance from the AR interactive control; and
displaying on the display an indication that the AR interactive control is activated in response to activating the AR interactive control.

17. The non-transitory computer-readable storage medium of claim 16, wherein the operations further comprise:
determining a closest position of the first plurality of positions to the first position of the surface;
determining the surface to have a second position based on the determined closest position plus a constant for the control indicator; and
associating a second threshold distance, less than the first threshold distance, with the second position of the surface.

18. The non-transitory computer-readable storage medium of claim 17, wherein a point of the surface is a first point and wherein the operations further comprise:
determining a plurality of closest positions of the first plurality of positions to a plurality of positions of a line along the surface associated with an AR interactive item of the AR interactive control;
determining new positions for the plurality of positions of the line based on a corresponding closest position of the plurality of closest positions plus the constant for the control indicator; and
associating the second threshold distance with the plurality of positions of the line.

19. The non-transitory computer-readable storage medium of claim 16, wherein the operations further comprise:
accessing an activation of the AR interactive control;
rendering an AR interactive item of the AR interactive control to be highlighted;
rendering the AR interactive item to move simultaneously with the control indicator along a predetermined line associated with the AR interactive item;
accessing a deactivation of the AR interactive control; and
rendering the AR interactive item to not be highlighted.

20. A method performed on augmented reality (AR) glasses, the method comprising:

determining a first position of a surface of a physical object based on an image from a first camera, an image from a second camera of the AR glasses, and based on $(R*X0)/(2*\tan((\Theta1/2)+C)*(x2-x1))$, where R is an optical distance between an optical axis of the first camera and an optical axis of the second camera, X0 is a width of a point of the surface in pixels of an image sensor of the first camera, x2 is based on a number of pixels from the optical axis of the image sensor of the second camera, x1 is based on a number of pixels from the optical axis of the first camera, $\Theta1$ is a view angle of the first camera and the second camera, and C is a compensation for distortions of the mobile device;

generating, based on the first position, an AR interactive control, wherein the AR interactive control is generated to appear to a user of the mobile device to be on the surface;

displaying on a display, of the mobile device, the AR interactive control;

determining a first plurality of positions of a control indicator controlled by a user;

activating the AR interactive control in response to detecting a position of the first plurality of positions of the control indicator controlled by the user transgresses a first threshold distance from the AR interactive control; and displaying on the display an indication that the AR interactive control is activated in response to activating the AR interactive control.

\* \* \* \* \*